(12) United States Patent
Kwak et al.

(10) Patent No.: US 10,958,088 B2
(45) Date of Patent: Mar. 23, 2021

(54) CHARGING CONTROL METHOD AND ELECTRONIC DEVICE FOR SUPPORTING THE SAME

(71) Applicant: Samsung Electronics Co., Ltd., Gyeonggi-do (KR)

(72) Inventors: Myung Hoon Kwak, Gyeonggi-do (KR); Hyun Joong Yoon, Gyeonggi-do (KR); Jung Hun Han, Chungcheongnam-do (KR); Yong Sang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 15/856,552

(22) Filed: Dec. 28, 2017

(65) Prior Publication Data
US 2018/0205253 A1   Jul. 19, 2018

(30) Foreign Application Priority Data

Jan. 18, 2017   (KR) .................. 10-2017-0008879

(51) Int. Cl.
*H02J 7/00* (2006.01)

(52) U.S. Cl.
CPC .......... *H02J 7/0032* (2013.01); *H02J 7/0036* (2013.01); *H02J 7/00* (2013.01); *H02J 7/0027* (2013.01); *H02J 7/00034* (2020.01); *H02J 2207/40* (2020.01)

(58) Field of Classification Search
CPC ........................................................ H02J 1/10
USPC ....................................................... 320/138
See application file for complete search history.

(56) References Cited

U.S. PATENT DOCUMENTS

| | | | |
|---|---|---|---|
| 7,952,231 B1 * | 5/2011 | Zansky | H02J 7/34 307/44 |
| 9,350,182 B2 | 5/2016 | Han et al. | |
| 9,459,659 B2 | 10/2016 | Chang | |
| 9,652,351 B2 | 5/2017 | Srivastava et al. | |
| 9,755,449 B2 | 9/2017 | Nge et al. | |
| 2014/0001861 A1 * | 1/2014 | Mann | G06F 1/30 307/66 |

(Continued)

FOREIGN PATENT DOCUMENTS

WO   2015/096743 A1   7/2015

OTHER PUBLICATIONS

Sherman, Len, "The Basics of USB Battery Charging: A Survival Guide" Dec. 9, 2010. pp. 1-15.
European Search Report dated Mar. 21, 2018.

*Primary Examiner* — Edward Tso
*Assistant Examiner* — Ahmed H Omar
(74) *Attorney, Agent, or Firm* — Cha & Reiter, LLC.

(57) ABSTRACT

An electronic device is provided. The electronic device includes a plurality of ports, a battery, a control circuit configured to control charging of the battery using power from a plurality of charging devices connected to the plurality of ports, a charging circuit configured to charge the battery using power supplied from the plurality of charging devices, and a plurality of communication circuits configured to communicate with the plurality of charging devices. The control circuit is configured to be electrically connected with the plurality of communication circuits and the charging circuit and set charging power level of each of the plurality of charging devices and battery charging power capacity of the charging circuit.

18 Claims, 17 Drawing Sheets

(56) References Cited

U.S. PATENT DOCUMENTS

| | | |
|---|---|---|
| 2015/0236522 A1* | 8/2015 | Zhao .................. H02J 7/00036 |
| | | 320/162 |
| 2015/0263550 A1 | 9/2015 | Han et al. |
| 2015/0357851 A1* | 12/2015 | Huang ................. H02J 7/0071 |
| | | 320/108 |
| 2016/0018850 A1 | 1/2016 | Chang |
| 2016/0094071 A1 | 3/2016 | Nge et al. |
| 2016/0156137 A1 | 6/2016 | Pan et al. |
| 2016/0179648 A1 | 6/2016 | Srivastava et al. |
| 2016/0204623 A1* | 7/2016 | Haggerty ............. H02J 7/0042 |
| | | 320/162 |
| 2016/0226266 A1 | 8/2016 | Huang |
| 2016/0352101 A1* | 12/2016 | Koo ....................... H02J 1/102 |

\* cited by examiner

CHARGING CONTROL METHOD AND ELECTRONIC DEVICE FOR SUPPORTING THE SAME

CLAIM OF PRIORITY

This application claims the benefit under 35 U.S.C. § 119(a) of a Korean patent application filed on Jan. 18, 2017 in the Korean Intellectual Property Office and assigned Serial number 10-2017-0008879, the entire disclosure of which is hereby incorporated by reference.

TECHNICAL FIELD

The present disclosure relates to controlling charging of an electronic device.

BACKGROUND

Recently, the distribution of various types of portable electronic devices, such as smartphones and tablet personal computers (PCs), has been expanded. Each of such portable electronic devices may include a battery. The battery may have a charging and discharging function. Thus, if the remaining capacity of the battery is less than or equal to a predetermined level, the charging of the battery may be needed.

SUMMARY

If a portable electronic device has only one charging port for charging the battery with a charging device connected to the charging port, the charging time may be long. Further, as capacity of the battery of the portable electronic device gets larger, the battery charging time may take even longer.

Aspects of the present disclosure may address at least the above-mentioned problems and/or disadvantages and may provide at least the advantages described below. Accordingly, an aspect of the present disclosure may provide a charging control method for optimizing charging efficiency while charged, by connecting at least one variable capacity charging device to a portable electronic device having a plurality of ports and an electronic device for supporting the same.

Accordingly, another aspect of the present disclosure is to provide a charging control method for determining charging power capacity of each of a plurality of variable capacity charging devices connected to a plurality of ports if the plurality of variable capacity charging devices are respectively connected to the plurality of ports, deriving the closest method to a charging voltage and a charging current of a charging integrated circuit (IC), and controlling a charging path of each of the plurality of ports and an electronic device for supporting the same.

As described above, various embodiments may shorten a charging time and may more stably operate a charging device and an electronic device by efficiently performing charging of a portable electronic device having a plurality of ports.

In accordance with an aspect of the present disclosure, an electronic device is provided. The electronic device may include a plurality of ports, a battery configured to receive a charging power through at least one of the plurality of ports, a control circuit configured to control charging of the battery using power from a plurality of charging devices connected to the plurality of ports, a charging circuit configured to charge the battery using power supplied from the plurality of charging devices and a plurality of communication circuits configured to communicate with the plurality of charging devices, wherein the control circuit is configured to be electrically connected with the plurality of communication circuits and the charging circuit and set a charging power level of each of the plurality of charging devices and battery charging power capacity of the charging circuit.

In accordance with another aspect of the present disclosure, a charging control method is provided. The method may include detecting a connection of a second charging device to another port while charging a battery of an electronic device based on a first charging device connected to one port among a plurality of ports, collecting information associated with a charging power capacity of the second charging device and setting charging power of the first charging device, charging power of the second charging device, and battery charging power capacity of a charging circuit of an electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
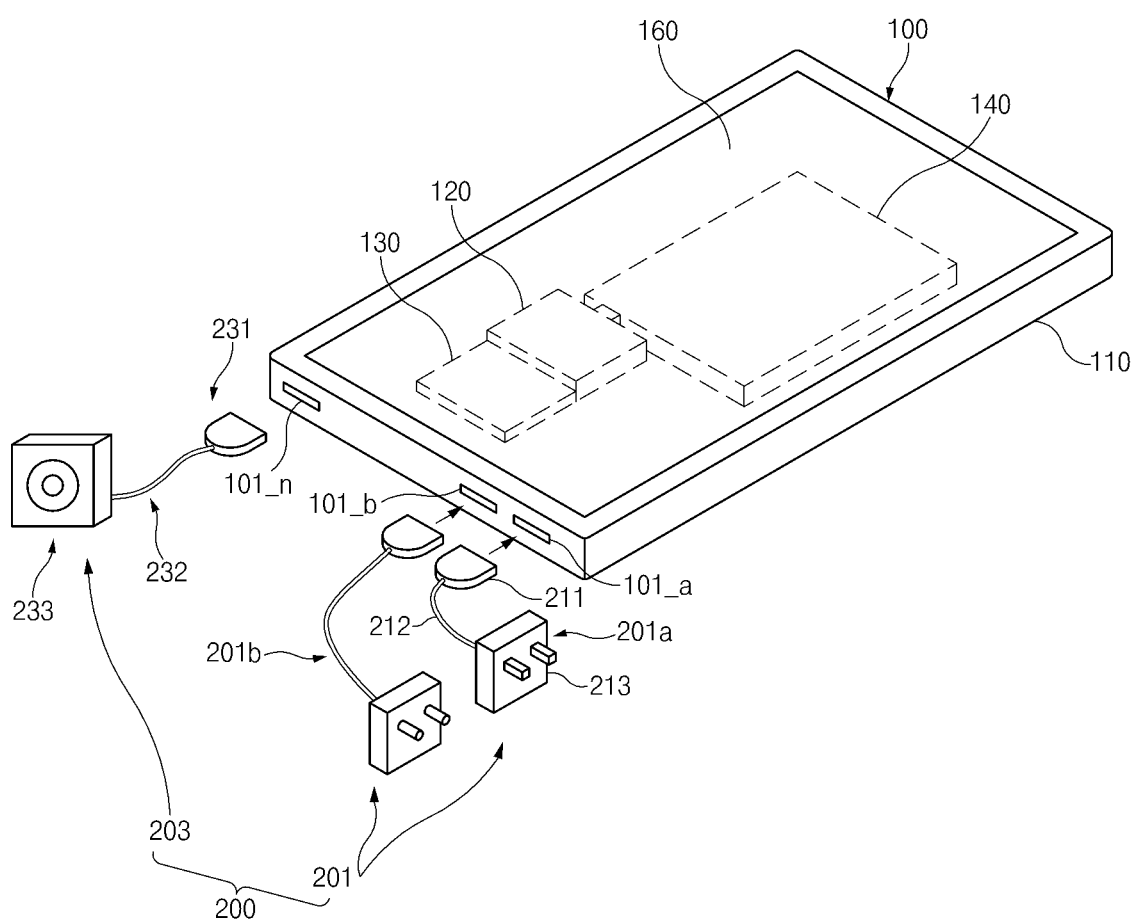
FIG. 1 is a drawing illustrating an example of an environment in which an electronic device is charged, according to an embodiment of the present disclosure.

Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices. Thus "first" does not necessarily mean primary, most preferred, or first in time.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TVT™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a drawing illustrating an example of an environment in which an electronic device is charged, according to an embodiment of the present disclosure.

Referring to FIG. 1, an external device connection environment of an electronic device according to an embodiment of the present disclosure may include an electronic device 100 and external device(s) 200 including at least one charging device. The external device connection environment according to an embodiment of the present disclosure may verify (or obtain information of) the type of the connected external device 200 and charging capacity of the external device 200 and may determine a charging rate at which a battery 140 of the electronic device 100 may be charged according to the charging capacity of the external device 200, thus efficiently charging the battery 140.

The electronic device 100 may include a plurality of ports 101_a, 101_b, and 101_n and may perform at least one of charging and discharging depending on a type of the external device 200 connected to the plurality of ports 101_a, 101_b, and 101_n. In this regard, the electronic device 100 may include a housing 110, the plurality of ports 101_a, 101_b, and 101_n, the battery 140, a charging circuit 120, and a controller 130. In addition, the electronic device 100 may include a display 160 for outputting a screen associated with operating the electronic device 100, a screen associated with a charging and discharging state, or the like, an audio device, or the like.

The housing 110 may cover an edge of the display 160 located on its front surface and may include a space which may embed various elements of the electronic device 100. For example, the battery 140, the charging circuit 120, the controller 130, or the like may be received in the housing 110. The plurality of ports 101_a, 101_b, and 101_n may be located at one side (e.g., at least one sidewall) of the housing 110.

At least one of the plurality of ports 101_a, 101_b, and 101_n may be located at one side of the housing 110. According to an embodiment, the plurality of ports 101_a, 101_b, and 101_n may be located at a lower sidewall of the housing 110. The plurality of ports 101_a, 101_b, and 101_n may include various types of connection ports, for example, universal serial bus (USB) type B, USB type C, and the like. According to an embodiment, the plurality of ports 101_a, 101_b, and 101_n may include a serial communication port such as a universal asynchronous receiver/transmitter (UART). A power consuming device 203 or at least one charging device 201a and 20b may be selectively connected to the plurality of ports 101_a, 101_b, and 101_n.

The battery 140 inside the housing 110 and may supply power necessary for operating the electronic device 100. The battery 140 may have a predetermined storage capacity level. The battery 140 may be charged by the charging circuit 120.

The charging circuit 120 may be electrically connected with the battery 140 and may supply a charging power supplied from the at least one charging device 201a or 20b to the battery 140 when the at least one charging device 201a or 20b are connected to the electronic device 100. Charging power capacity of the battery 140 at the charging device 120 may be determined (or set) by a level or characteristic of the battery 140. If the plurality of charging devices 201a and 20b are connected to the plurality of ports 101_a, 101_b, and 101_n, the charging circuit 120 may supply charging power to the battery 140, that is received from the plurality of charging devices 201a and 201b. The charging power corresponds to the battery charging power capacity for charging the battery 140. The battery power capacity can depend on control by the controller 130.

The controller 130 may verify (or obtain) the type of the external devices 200 (collectively, individually, 201a, 201b, and 203) connected to the plurality of ports 101_a, 101_b, and 101_n. The controller 130 may receive charging power from the external device 200 or may supply power to the external device 200. In this regard, the controller 130 may include a control circuit, and a plurality communication circuits corresponding to the plurality of ports. The control circuit (e.g., a microcontroller or a central processing unit (CPU)) controls a charging path of each of the plurality of ports 101_a to 101_n based on determinations made by the communication circuits connected with the external device 200 via each of the plurality of ports 101_a to 101_n. For example, the control circuit can connected the ports 101_a to 101_n to a particular circuit such as a configuration channel (CC), adaptive fast charging (AFC), quick charge (QC), or power delivery (PD), which may determine capacity of a charging device). The determination of the communication circuits can be based on information associated with the external device 200. This information can include, for example, the type of a connection device or information about capacity of a charging device. If the external device 200 connected to the ports 101_a, 101_b, and 101_n are connected based on USB type C, the controller 130 may communicate with the external device 200 using a CC pin and may verify (or obtain information of) capacity associated with power transmission, thus adjusting a level of transmission capacity.

The external device 200 may include, for example, a charging devices 201 and the power consuming device 203.

The power consuming device 203 may include a device for performing a specified function using battery 140 power of the electronic device 100. For example, the power consuming device 203 may include various devices, such as a dongle device, a storage device, an external speaker device, an external microphone device, and an external camera device.

The charging devices 201 may include, for example, the first charging device 201a and the second charging device 201b. According to various embodiments, the charging devices 201 for charging may include one or more charging devices. At least one of the first charging device 201a and the second charging device 20b included in the charging devices 201 may include a variable charging device. In the variable charging device the charging power capacity is changeable and variable. At least one of the first charging device 201a and the second charging device 20b included in the charging devices 201 may output charging power that is based on a predetermined voltage value and a predetermined current value to the electronic device 100. If the charging devices 201 are connected to a specific port among the plurality of ports 101_a, 101_b, and 101_n, the charging devices 201 may be assigned charging power capacity providable from the charging devices 201 from the controller 130 of the electronic device 100 and may supply a charging power corresponding to the assigned charging power capacity to the charging circuit 120.

The first charging device 201a may include, for example, a connector 211, a cable 212, and a plug 213. The connector 211 may be electrically or physically inserted into at least one of the ports 101_a, 101_b, and 101_n of the electronic device 100. The connector 211 may have a reverse negative shape of the interior of port 101_a. For example, if each of the plurality of ports 101_a, 101_b, and 101_n has USB type C, the connector 211 may have a connector shape which may be inserted into USB type C.

The cable 212 may be located between the connector 211 and the plug 213 and may electrically connect the connector 211 with the plug 213. In this regard, at least one signal line may be carried by the cable 212. The controller 130 of the electronic device 100 may increase a battery charging power of a charging circuit located in the charging circuit 120 depending on the cable 212. For example, different cables may have different electrical resistances. The electrical resistance of the cable results in consuming some portion of the power that is carried from the plug 213 to the connector. As a result, there may be a maximum amount of power that the cable 212 can conduct. The controller 130 may request at least one of the plurality of charging devices 201a and 20b connected to the ports 101_a and 101_b to supply an amount of power that is consumed by the cable 212 depending on a resistance characteristic of the cable 212. Thus, a charging power the controller 130 requests the at least one charging device to supply may be based on battery charging power capacity supplied to the battery 140 at the charging circuit of the charging circuit 120 and power consumed by the cable 212.

The plug 213 may be configured to be connected with the cable 212 on one side and be inserted into a power outlet on the other side. The plug 213 may vary in shape depending on a shape of an electrical outlet. The plug 213 may include internally, a charging control circuit which may change charging power capacity. The first charging device 201a may provide a charging power requested by the electronic device 100, based on the charging control circuit located inside the plug 213. In this regard, a communication circuit which may communicate with the electronic device 100 may be located inside the plug 213.

The second charging device 20b may be substantially the same or similar charging device to the first charging device 201a and may include a connector, a cable, a plug, or the like. According to various embodiments, the second charging device 20b may be a charging device which has a different chargeable charging power capacity from that of the first charging device 201a. Alternatively, the second charging device 20b may be a charging device which has a different charging speed (e.g., performs fast charging) from the first charging device 201a. Alternatively, the second charging device 20b may be a charging device which has the same charging power capacity as the first charging device 201a.

In the above description, an embodiment is disclosed where the electronic device has the three ports 101_a, 101_b, and 101_n. However, embodiments of the present disclosure are not limited thereto. For example, the electronic device 100 may include two or more ports. Thus, two or more external devices (e.g., two or more charging devices, one power consuming device and at least one charging device, another charging device and at least one power consuming device, or a plurality of power consuming devices and a plurality of charging devices) may be connected to the electronic device 100.

As described above, according to various embodiments of the present disclosure, in the environment where the electronic device 100 is connected with an external electronic device, the electronic device 100 may verify (or obtain information of) charging power capacity receivable from each of a plurality of charging devices. The electronic device 100 may verify (or obtain information of) charging power through a communication circuit and may select a possible battery charging function. The selected battery charging function may depend on a battery charging function (e.g., a general charging function or a fast charging function) supportable by external electronic devices (e.g., charging devices). The electronic device 100 may set (or determine) a charging power of each of the external electronic devices (e.g., the charging devices) based on the selected battery charging function and may charge the battery 140. According to various embodiments, a required amount of power may vary according to a battery charging function or mode (e.g., a general charging function or a fast charging function) in a process of charging the battery 140 of the electronic device 100. Thus, in an environment where a plurality of charging devices are connected to the electronic device 100, if the sum of the amounts of charging power providable from the plurality of charging devices is larger than an amount of power needed in a battery charging mode (e.g., a fast charging mode), the electronic device 100 may conserve power by reducing a transmit power of each of the plurality of charging devices. The electronic device 100 may adjust the sum of amounts of power needed in the battery charging mode to an amount of battery charging power of each of the plurality of charging devices. According to various embodiments, if charging power capacity receivable from charging devices is increased after adding a charging device or changing a battery charging mode (e.g., if a general charging function is changed to a fast charging function or if the fast charging function is changed to the general charging function), the electronic device 100 may increase or decrease a battery charging power necessary for the battery 140 (e.g., increase and decrease an input power supplied to the battery 140 at a charging circuit or increase and decrease a battery charging power received from charging devices at the charging circuit) and may charge the battery 140.

According to various embodiments of the present disclosure, in an environment where the electronic device 100 is connected with an external electronic device, the electronic device 100 may verify (or obtain information of) charging power capacity providable from each charging device via its communication circuit. If charging capacity receivable from a plurality of charging devices is greater than or equal to a first reference value (e.g., 25 W) of the charging circuit 120 (or a charging circuit), the electronic device 100 may determine a charging power of each charging device based on the first reference value. If the charging capacity receivable from the plurality of charging devices is less than the first reference value of the charging circuit 120, the electronic device 100 may determine a charging power of each charging device based on a maximum value of charging power capacity providable from each charging device. Alternatively, if the charging capacity receivable from the plurality of charging devices is less than the first reference value of the charging circuit 120, the electronic device 100 may determine a specified second reference value (e.g., 5 W), which is lower than the sum of charging capacity of the plurality of charging devices, as a charging power of each of the charging devices.

As described above, in a charging system of the electronic device 100 according to various embodiments of the present disclosure, if the first charging device 201*a* and the second charging device 20*b* are connected to ports, a hardware charging module (e.g., the controller 130 and the charging circuit 120) connected with the ports may charge the battery 140 by using at least part of the sum of charging power capacity of the first charging device 201*a* and charging power capacity of the second charging device 20*b* as battery charging power capacity of the charging circuit. In this operation, the charging module may determine charging power capacity of the plurality of charging devices 201*a* and 20*b* in consideration of charging efficiency of the charging circuit 120. For example, the charging module may request the plurality of charging devices 201*a* and 20*b* to supply a battery charging power which is higher than an input power for charging the battery 140 (e.g., power supplied to the charging circuit at the charging devices 201*a* and 20*b* or a charging power of each of the charging devices 201*a* and 20*b* in view of the charging devices 201*a* and 201*b*) in consideration of charging efficiency of the charging circuit 120. According to an embodiment, the controller 130 may adjust a level of a charging power received from each of the plurality of charging devices 201*a* and 20*b* in consideration of power consumed by a process where the charging circuit 120 charges the battery 140. Thus, a battery charging power of the charging circuit 120 may include input power capacity necessary for charging the battery 140 and power consumed by driving the charging circuit 120. The charging circuit 120 may receive battery charging power capacity, which is higher than an input power capacity to be supplied to the battery 140 by a specified level, from the plurality of charging devices 201*a* and 20*b* and may use part of the received battery charging power capacity for its own driving, thus transmitting an input power necessary for charging the battery 140 (e.g., an output power of the charging circuit, a necessary power necessary for charging the battery 140, a requirement power required for charging the battery 140, or the like) to the battery 140.

Figure 2:
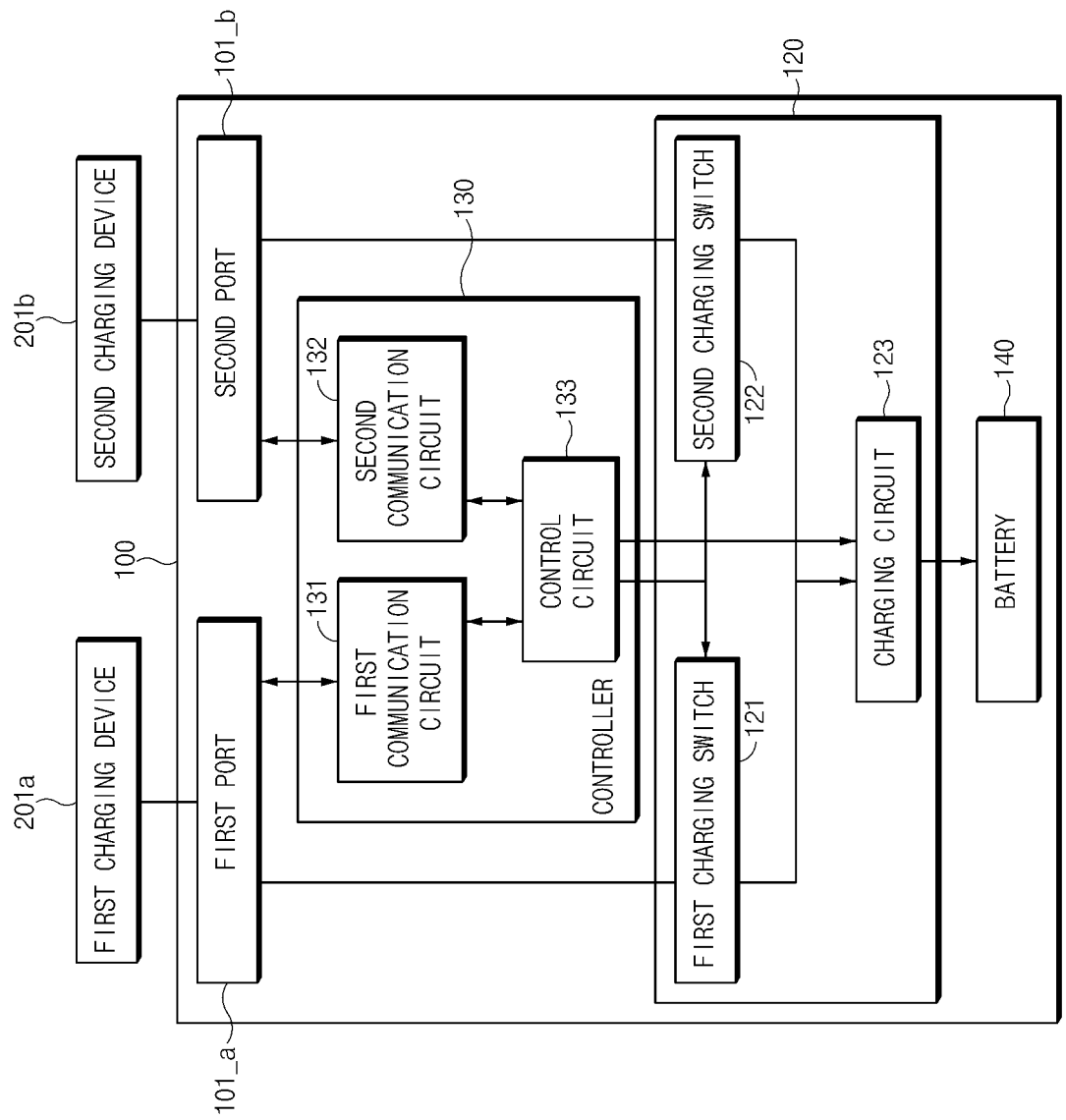
FIG. 2 is a block diagram illustrating an example of a charging system of an electronic device according to an embodiment of the present disclosure.

FIG. 2 is a block diagram illustrating an example of a charging system of an electronic device according to an embodiment of the present disclosure.

Referring to FIG. 2, an electronic device 100 may include a first port 101_*a*, a second port 101_*b*, a controller 130, a charging circuit 120, and a battery 140. In addition, the electronic device 100 may further include a display 160, an audio device, a camera, or the like described with reference to FIG. 1.

For example, a specified connector (e.g., USB type C) may be inserted into the first port 101_*a* and the second port 101_*b*. The first port 101_*a* and the second port 101_*b* may be located at one side of a housing 110 of FIG. 1 and may be electrically connected to the controller 130. Further, the first port 101*a* a and the second port 101_*b* may be electrically connected with the charging circuit 120.

The controller 130 may include a first communication circuit 131, the second communication circuit 132, and a control circuit 133.

The first communication circuit 131 may establish a communication channel with the first charging device 201*a* connected to the first port 101_*a*. The communication channel may transmit and receive a charging control signal or may recognize a charging mode, in a CC, AFC, QC, or PD. According to an embodiment, the control circuit 133 may cause the first communication circuit 131 to request the first charging device 201*a* to identify the type of the first charging device 201*a*, charging power capacity, or the like. The first communication circuit 131 may request the first charging device 201*a* to supply specified charging power capacity in response to control of the control circuit 133.

The second communication circuit 132 may establish a communication channel with the second charging device 20*b* connected to the second port 101_*b*. The communication channel may be used to transmit and receive the same or similar communication control signal to the communication channel established by the first communication circuit 131. For example, a charging control signal may be transmitted and received or a charging mode may be recognized, in a CC, AFC, QC, or PD. Control circuit 133 may cause the second communication circuit 132 to request the second charging device 20*b* to identify a type of the second charging device 201*b*, charging power capacity. The second communication circuit 132 may request the second charging device 20*b* to supply specified charging power capacity in response control of the control circuit 133.

The control circuit 133 may control the first communication circuit 131 and the second communication circuit 132. For example, if the first charging device 201*a* is connected to the first port 101_*a*, the control circuit 133 may recognize a connection of the first charging device 201*a*. According to an embodiment, the control circuit 133 may recognize a connection of the first charging device 201*a* based on a pull-up voltage held on the first port 101_*a* or may verify (or obtain information of) a connection of an external device 100 of FIG. 1 to the first port 101_*a* at a predetermined period. The control circuit 133 can verify (or obtain information of) connection of an external device 100 to the first port 101 at the predetermined period by transmitting an electrical signal and observing any electrical signals received in response. Additionally, the control circuit 133 can verify (or obtain information of) connection of an external device 100 through observing a reference voltage connected to the first port 101_*a*. If the first charging device 201*a* is connected to the first port 101_*a*, the control circuit 133 may control the first communication circuit 131 to obtain information identifying the type of the first charging device 201*a* or charging power capacity (or charging variable capacity) of the first charging device 201*a*, or the like. The control circuit 133 may verify (or obtain information of) battery charging power capacity of the charging circuit 120 connected to the battery 140 and may request the first charging device 201*a* to supply charging power capacity corresponding to the battery charging power capacity. In this operation, if the first charging device 201*a* has charging power capacity which is lower than the battery charging power capacity, the control circuit 133 may request the first charging device 201*a* to supply maximum charging power capacity providable from the first charging device 201*a*. If the first charging device 201*a* has charging power capacity which is higher than the battery charging power capacity, the control circuit 133 may request the first charging device 201a to supply charging power capacity corresponding to the battery charging power capacity.

If the external device 200 is connected to the second port 101_b in a state where the first charging device 201a is connected to the first port 101_a, the control circuit 133 may verify a type of the external device 200 via the second communication circuit 132. Alternatively, the control circuit 133 may verify a type of the external device 200 depending on a level of a pull-up voltage changed by the external device 200 connected to the second port 101_b. If the external device 200 is the second charging device 201b, the control circuit 133 may determine whether to use the second charging device 20b depending on a level of charging power capacity of the first charging device 201a. For example, if the charging power capacity of the first charging device 201a is higher than the battery charging power capacity of the charging circuit 120, the control circuit 133 might not use the second charging device 20b although the second charging device 20b is connected. For example, the charging circuit 120 may establish an open circuit along the electrical path between the second charging port and the battery 140. In this regard, the control circuit 133 may output guide information for informing a user that a connection of the second charging device 201b is unnecessary, through the display or the audio device.

If the charging power capacity of the first charging device 201a first connected is lower than the battery charging power capacity of the charging circuit 120, the control circuit 133 may use the second changing device 201b. For example, the control circuit 133 may verify (or obtain information of) a variable range of charging power capacity of the second charging device 20b and may request the second charging device 20b to supply a charging power of a predetermined level.

According to an embodiment, if the charging power capacity of the first charging device 201a first connected is lower than the battery charging power capacity of the charging circuit 120 and if the charging power capacity of the second charging device 20b is higher than the battery charging power capacity of the charging circuit 120, the control circuit 133 may stop a charging operation of the first charging device 201a and may request the second charging device 20b to supply a charging power corresponding to the battery charging power capacity. The control circuit 133 can cause this by selectively establishing an electrical short circuit between the second port 101_b and the battery and establishing an open circuit between the first port 101_a and the battery. In this operation, the control circuit 133 may output guide information for informing the user that a charging operation based on the first charging device 201a is stopped, through the display or the audio device. Verifying the guide information, may cause the user to remove the first charging device 201a from the first port 101_a.

According to various embodiments, if first charging power capacity of the first charging device 201a first connected is lower than the battery charging power capacity of the charging circuit 120 and if second charging power capacity of the second charging device 20b is lower than the battery charging power capacity of the charging circuit 120, the control circuit 133 may request the second charging device 20b to supply power in which the first charging power capacity is subtracted from the battery charging power capacity, while maintaining the charging operation of the first charging device 201a. In this operation, the control circuit 133 may output guide information for informing the user that a charging operation is performed using the first charging device 201a and the second charging device 201b, through the display or the audio device.

According to various embodiments, if the charging power capacity of both the first charging device 201a and the second charging device 20b are lower than the battery charging power capacity of the charging circuit 120, the control circuit 133 may request each of the first charging device 201a and the second charging device 20b to supply power corresponding to a half of the battery charging power capacity. Thus, while supplying a maximum charging power, the both the first charging device 201a and the second charging device 20b may supply power corresponding to a half of the battery charging power capacity to the charging circuit 120. The foregoing can be caused by the control circuit 133. In this operation, the control circuit 133 may output guide information for informing the user that a charging operation is performed using the first charging device 201a and the second charging device 201b, through the display or the audio device.

According to various embodiments, if the charging power capacity of both the first charging device 201a and second charging device 20b are higher than the battery charging power to charge the battery 140 at the charging circuit 120 charging circuit 120, the control circuit 133 may request each charging device 201a, 20b to supply power corresponding to a half of the battery charging power capacity. Thus, the electronic device 100 may enhance the charging circuit 120.

According to various embodiments, although the charging power capacity of the first charging device 201a is higher than the battery charging power capacity of the charging circuit 120, the electronic device 100 might only use the second charging device 201b. For example, the control circuit 133 may obtain information about variable charging power capacity providable from the second charging device 20b and may adjust a level of a charging power of each of the first charging device 201a and the second charging device 20b depending on a level of maximum charging power capacity of the second charging device 201b. According to an embodiment, if the charging power capacity of the first charging device 201a is higher than the battery charging power capacity of the charging circuit 120 and if the charging power capacity of the second charging device 20b is higher than the battery charging power capacity of the charging circuit 120, the control circuit 133 may charge the battery 140 with a charging power of the first charging device 201a, corresponding to the battery charging power capacity of the charging circuit 120, during a first time and may change the battery 140 with a charging power of the second charging device 201b, corresponding to the battery charging power capacity, during a second time.

In this operation, the second charging device 20b may maintain an inactive state (a non-power supply state) during the first time, and the first charging device 201a may maintain the inactive state (the non-power supply state) during the second time. Based on the above-mentioned operation, elements associated with the second charging device 201b, such as the second charging device 20b and the second port 101_b, may have an idle period during the first time, and elements associated with the first charging device 201a, such as the first charging device 201a and the first port 101_a, may have an idle period during the second time. The idle periods can be repeated an alternating. Thus, the charging device or the electronic device 100 may avoid overheating, thereby increasing the relative life of a specific element.

In certain embodiments, the electrical path between the first port and the second port can be controlled by an electrical relay. An electrical inverter can be placed at the input of one of the electrical relays. The control circuit can cause the alternating charging between by the first charging device 201a and the second charging device 20b by transmitting a square wave to each relay. During the duty cycle of the square wave, the relay with the inverter will be establish an open circuit between the charging device while the other relay will establish an electrical short circuit between the charging device and the battery. During the off-duty cycle of the square wave, the opposite will occur.

According to various embodiments, if the first charging power capacity of the first charging device 201a is higher than the battery charging power capacity of the charging circuit 120 and if the second charging power capacity of the second charging device 20b is higher than the battery charging power capacity of the charging circuit 120, the control circuit 133 may request the second charging device 20b to supply the second charging power (e.g., a maximum charging power) of the second charging device 20b during the first time and may request the first charging device 201a to supply power in which the second charging power capacity is subtracted from the battery charging power capacity. The control circuit 133 may charge the battery 140 with the first charging power capacity of the first charging device 201a during the second time after the first time. The first time and the second time may include times into where the time necessary for fully charging the battery 140 is divided or repeated at intervals of a specified time (e.g., if the first charging device 201a and the second charging device 20b are changed in charging state at intervals of one minute, each of the first time and the second time may be one minute). Based on the above-mentioned operation, as the elements, such as the first charging device 201a and the first port 101_a, associated with the first charging device 201a supplies a relatively low charging power during the second time, a burden imposed on the electronic device 100 may be reduced.

The charging circuit 120 may include a first charging switch 121, a second charging switch 122, and a charging circuit 123. According to various embodiments, the charging circuit 120 may include only the charging circuit 123, and the first charging switch 121 and the second charging switch 122 may be included in the controller 130. The charging circuit 123 may be displayed as one block, but may include a plurality of charging circuits. In certain embodiments, the first charging switch 121 and the second charging switch 122 can include a first and second relay.

The first charging switch 121 may be located between the first port 101_a and the charging circuit 123. The first charging switch 121 may be activated (closed, thereby establishing an electrical short circuit) or deactivated (opened, thereby establishing an open circuit) according to control of the control circuit 133. For example, the first charging switch 121 may be opened while a charging operation using the first charging device 201a is stopped and may be closed while the charging operation using the first charging device 201a is performed, depending on control of the control circuit 133.

The second charging switch 122 may be located between the second port 101_b and the charging circuit 123. The second charging switch 122 may be activated (closed, thereby establishing an electrical short circuit) or deactivated (opened, thereby establishing an open circuit) according to control of the control circuit 133. For example, the second charging switch 122 may be opened while a charging operation using the second charging device 20b is stopped and may be closed while the charging operation using the second charging device 20b is performed, depending on control of the control circuit 133.

According to various embodiments, if the first charging device 201a is connected to the first port 101_a, the first charging device 121 may be turned on according to control of the control circuit 133. If the second charging device 20b is connected to the second port 101_b in a state where the first charging device 201a is connected to the first port 101_a, the first charging switch 121 may maintain a closed state or a opened state in response to charging power capacity of the second charging device 20b or may have a closed or open state at a predetermined period.

According to an embodiment, if the first charging power capacity of the first charging device 201a is higher than the battery charging power capacity of the charging circuit 123, although the second charging device 20b is connected, the first charging switch 121 may maintain a closed state depending on control of the control circuit 133 and may maintain a opened state depending on control of the control circuit 133. Alternatively, if the first charging power capacity of the first charging device 201a is higher than the battery charging power capacity of the charging circuit 123 and if the second charging power capacity of the second charging device 20b is higher than the battery charging power capacity of the charging circuit 123, the first charging switch 121 and the second charging switch 122 may be alternately turned on and off at a predetermined period depending on control of the control circuit 133. Alternatively, if the first charging power capacity of the first charging device 201a first connected is higher than the battery charging power capacity of the charging circuit 123 and if the second charging power capacity of the second charging device 20b is higher than the battery charging power capacity of the charging circuit 123, the first charging switch 121 may be changed from a closed state to a opened state depending on control of the control circuit 133 and the second charging switch 122 may be changed from a opened state to a closed state depending on control of the control circuit 133.

According to an embodiment, if the first charging power capacity of the first charging device 201a is lower than the battery charging power capacity of the charging circuit 123 and if the second charging power capacity of the second charging device 20b is higher than the battery charging power capacity of the charging circuit 123, the first charging switch 121 may be changed from the closed state to the opened state depending on control of the control circuit 133 and the second charging switch 122 may be changed from the opened state to the closed state depending on control of the control circuit 133. Alternatively, if the first charging power capacity of the first charging device 201a is lower than the battery charging power capacity of the charging circuit 123 and if the second charging power capacity of the second charging device 20b is higher than the battery charging power capacity of the charging circuit 123, the first charging switch 121 may be alternately turned on and off at a predetermined period depending on control of the control circuit 133 and the second charging switch 122 may have the closed state to reduce a burden of elements located on a second charging path. While the first charging switch 121 is closed, the second charging device 201b may supply a charging power, in which a charging power supplied from the first charging device 201a is subtracted from the battery charging power capacity of the charging circuit 123, to the charging circuit 123. While the first charging switch 121 is opened, the second charging device 20b may supply a charging power corresponding to the battery charging power capacity to the charging circuit 123.

According to an embodiments, if the first charging power capacity of the first charging device 201a is lower than the battery charging power capacity of the charging circuit 123 and if the second charging power capacity of the second charging device 20b is lower than the battery charging power capacity of the charging circuit 123, each of the first charging switch 121 and the second charging switch 122 may maintain the closed state depending on control of the control circuit 133.

As the charging circuit 123 is connected to the first charging switch 121 and the second charging switch 122 and as the first charging switch 121 or the second charging switch 122 is closed, the charging circuit 123 may supply a charging power supplied from the first charging device 201a or a charging power supplied from the second charging device 20b to the battery 140. The charging circuit 123 may have the battery charging power capacity, and the battery charging power capacity may be determined according to capacity, a characteristic, or the like of the battery 140.

According to an embodiment, if the first charging device 201a is connected to the first port 101_a among a plurality of ports, the first charging switch 121 connected to the first port 101_a may be closed and the charging circuit 123 may charge the battery 140 with a charging power provided from the first charging device 201a. According to various embodiments, if the first charging device 201a is connected to the first port 101_a and if the second charging device 20b is connected to the second port 101_b, at least one of the first charging switch 121 and the second charging circuit 122 may be closed in response to control of the control circuit 133 described above and the charging circuit 123 may supply an input power, including at least part of a charging power of the first charging device 201a and a charging power of the second charging device 201b, to the battery 140.

According to various embodiments, a control circuit may be configured to request each of a first charging device and a second charging device to supply a charging power of each of a first charging device and a second charging device such that a charging power capacity or voltage of the first charging device is the same as that of the second charging device or is higher than that of the second charging device by a specified level.

According to various embodiments, when one charging circuit receives inputs of two ports, the control circuit may provide the same charging mode (e.g., set the same voltage).

According to various embodiments, the charging circuit may include two circuits. Each of the two circuits may receive a charging power from at least one charging device and may transmit the received charging power to a battery.

Figure 3:
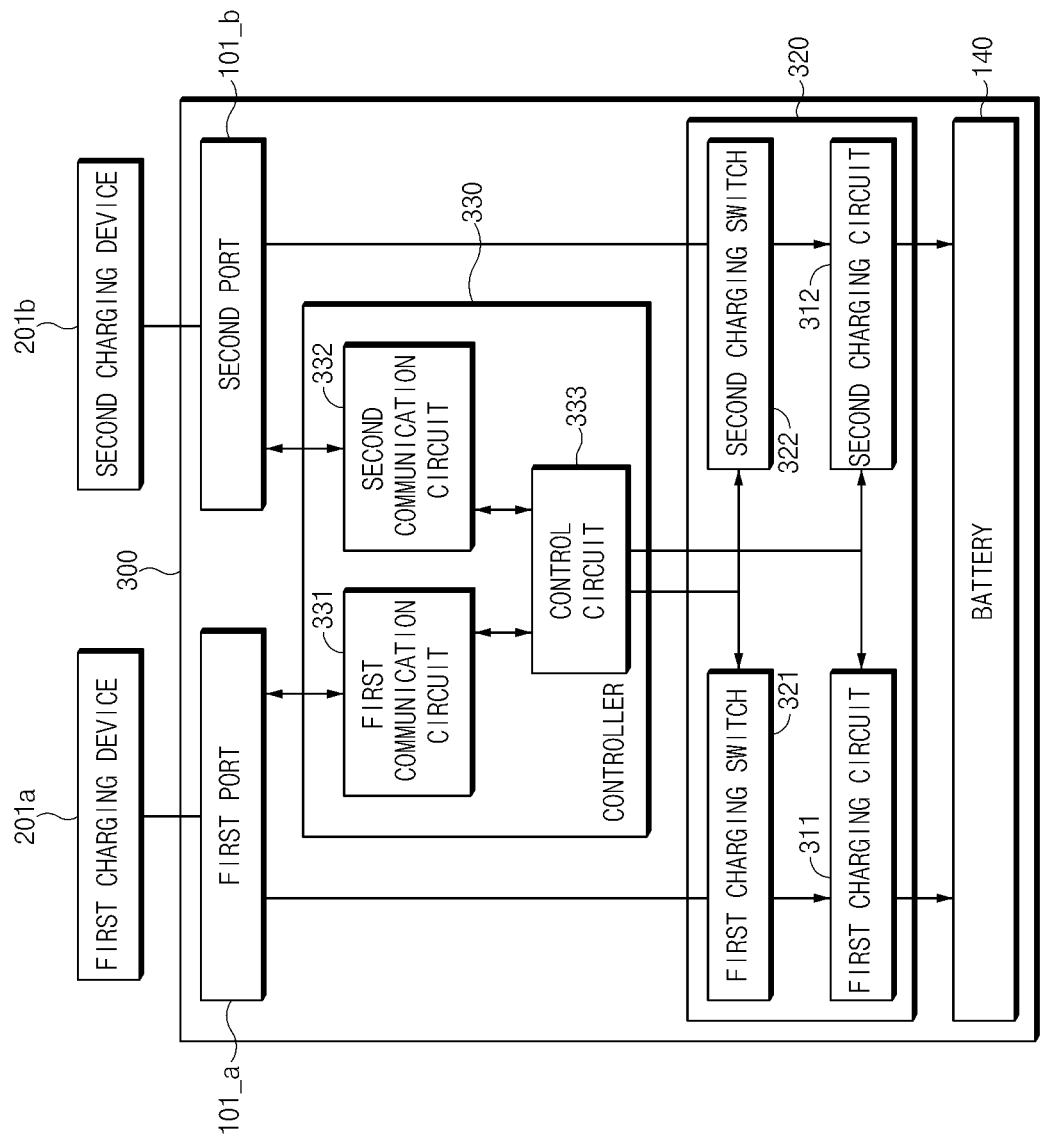
FIG. 3 is a block diagram illustrating another example of a charging system of an electronic device according to an embodiment of the present disclosure.

FIG. 3 is a block diagram illustrating another example of a charging system of an electronic device according to an embodiment of the present disclosure.

Referring to FIG. 3, an electronic device 300 according to an embodiment of the present disclosure may include a first port 101_a, a second port 101_b, a controller 330, a charging unit 320, and a battery 140. In the above-mentioned configuration, the first port 101_a, the second port 101_b, the controller 330 (e.g., a first communication circuit 331, a second communication circuit 332, and a control circuit 333), and the battery 140 may be substantially the same or similar to a first port 101a, a second port 101_b, a controller 130, and a battery 140 described with reference to FIGS. 1 and 2.

The charging unit 320 may include a first charging switch 321, a second charging switch 322, a first charging circuit 311, and a second charging circuit 312.

The first charging switch 321 may be located between the first port 101_a and the first charging circuit 311 and may have a closed or open state in response to control of the control circuit 333. The first charging switch 321 may transmit, for example, a charging power supplied from the first charging device 201a connected to the first port 101_a to the first charging circuit 311.

The second charging switch 322 may be located between the second port 101_b and the second charging circuit 312 and may have a closed or open state in response to control of the control circuit 333. The second charging switch 322 may transmit, for example, a charging power supplied from the second charging device 20b connected to the second port 101_b to the second charging circuit 312.

The first charging circuit 311 may supply, for example, an input power based on a first input voltage and a first input current to the battery 140. The first input voltage permitted by the first charging circuit 311 may be requested to the first charging device 201a such that the first charging device 201a supplies a charging power. The first charging device 201a may transmit a charging current corresponding to the first input voltage of the first charging circuit 311 to the first charging circuit 311.

The second charging circuit 312 may supply, for example, an input power based on a second input voltage and a second input current to the battery 140. The second input voltage permitted by the second charging circuit 312 may be requested to the second charging device 20b such that the second charging device 20b supplies a charging power. The second charging device 20b may transmit a charging current corresponding to the second input voltage of the second charging circuit 312 to the second charging circuit 312. The second input voltage and the second input current may be the same or different from the first input voltage and the first input current, respectively.

Since the charging unit 320 having the plurality of charging circuits 321 and 322 provides a charging current using different voltages depending on variable charging characteristics of charging devices connected to ports, it may provide an advantage of using the various charging devices used to charge the battery 140. In case of a charging circuit 123 described above with reference to FIG. 2, as the one charging circuit 123 is used, the first charging device 201a and the second charging device 20b may select a charging voltage based on a battery charging power of the charging circuit 123 and may supply a charging current mapped to the selected charging voltage to the charging circuit 123.

According to an embodiment, although a first charging voltage of a first charging power of the first charging device 201a is different from a second charging voltage of a second charging power of the second charging device 201b, the first charging circuit 311 and the second charging circuit 312 may support various input voltages. Thus, the first charging device 201a and the second charging device 20b may be controlled to equally or non-equally divide an amount of battery charging power of the charging circuit 123. If the battery 140 is charged via the one charging circuit 123, the first charging device 201a and the second charging device 20b may supply a charging current to the battery 140 using a charging voltage of any one of the first charging device 201a and the second charging device 20b (or an input voltage of the charging circuit 123).

Alternatively, the control circuit 333 may select at least one charging device having the same charging voltage as an input voltage of the first charging circuit 311 (or a battery charging circuit of a charging circuit) among charging voltages of a plurality of charging devices (or the same charging voltage as an input voltage set for a charging device first connected) and may select at least one charging device having the same charging voltage as an input voltage of the second charging circuit 312 (or the same charging voltage as the input voltage set for the charging device first connected), thus requesting each of the plurality of charging devices to supply a charging current corresponding to an input current of each charging circuit (or the battery charging current of the charging circuit). In this operation, the control circuit 333 may request each of the plurality of charging devices such that the sum of a charging current of the first charging circuit 311 and a charging current of the second charging circuit 312 is the same as an amount of total charging current to be supplied to the battery 140 or is higher than the amount of total charging current by a specified level (e.g., a level in consideration of power consumed by the controller 330 or the charging unit 320). For example, the control circuit 333 may request the first charging device 201*a* and the second charging device 20*b* to supply the sum of current consuming to be used by a charging module and a charging current of the battery 140.

Figure 4:
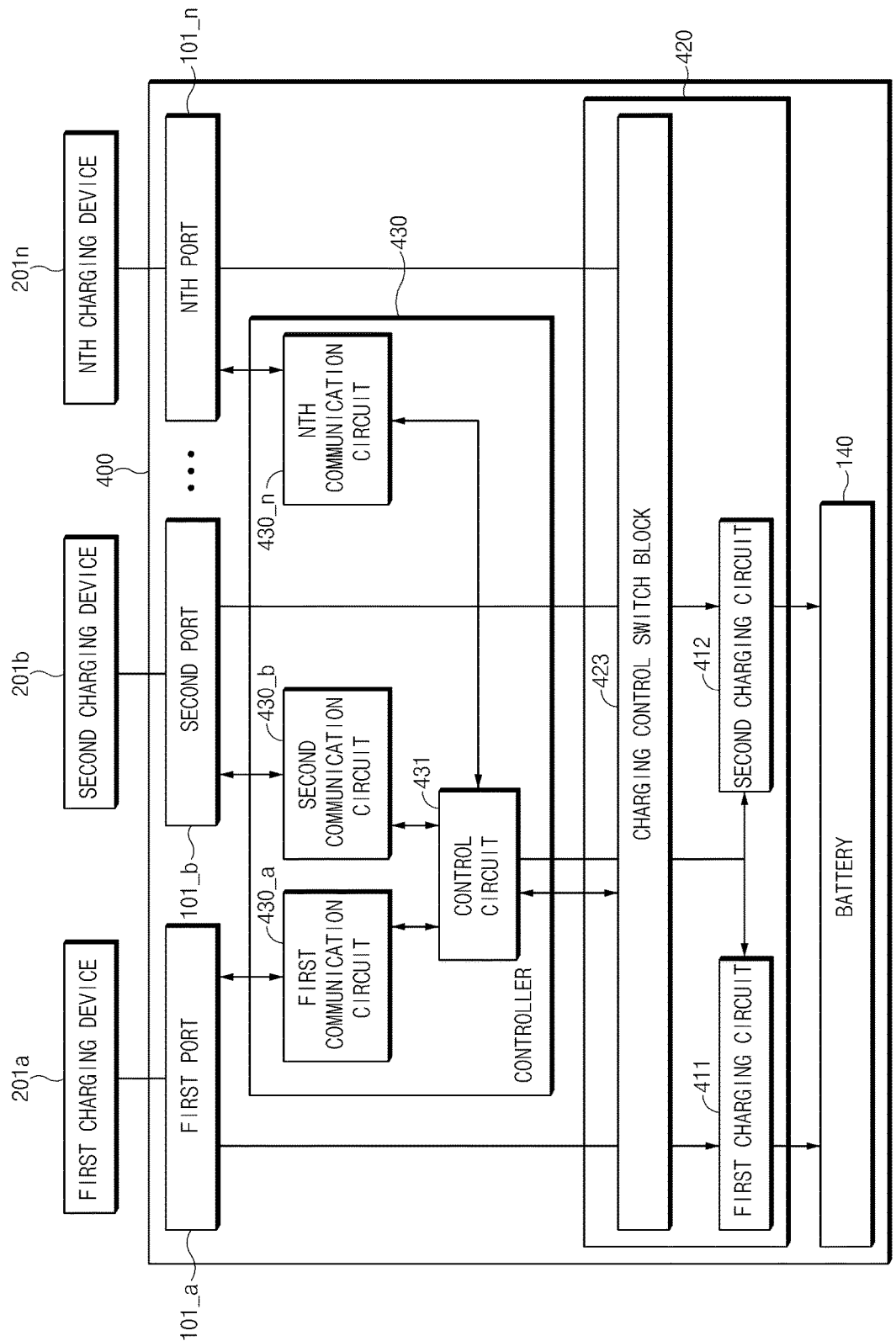
FIG. 4 is a block diagram illustrating another example of a charging system of an electronic device according to an embodiment of the present disclosure.

FIG. 4 is a block diagram illustrating another example of a charging system of an electronic device according to an embodiment of the present disclosure.

Referring to FIG. 4, an electronic device 400 may include a plurality of ports 101_*a* to 101_*n*, a controller 430, a charging unit 420, and a battery 140.

The plurality of ports 101_*a* to 101_*n* may include, for example, the first port 101_*a* to the Nth port 101_*n*. A first charging device 201*a* may be connected to the first port 101_*a*, a second charging device 20*b* may be connected to the second port 101_*b*, and an Nth charging device 201*n* may be connected to the Nth port 101_*n*. The plurality of charging devices 201*a* to 201*n* respectively connected to the plurality of ports 101_*a* to 101_*n* may have different charging power capacity. For example, at least one of the plurality of charging devices 201*a* to 201*n* may be a variable charging device and may provide a charging power of various charging voltages and various charging currents corresponding to the various charging voltages. At least one of the various charging voltages may include voltage matched with an input voltage of a first charging circuit 411 or a second charging circuit 412. Alternatively, at least one of the various charging voltages may include voltage compatible with an input voltage of the first charging circuit 411 or the second charging circuit 412.

The controller 430 may include a plurality of communication circuits 430_*a* to 430_*n* and a control circuit 431. For example, the plurality of communication circuits 430_*a* to 430_*n* may include the first communication circuit 430_*a* communicable with the first charging device 201*a*, the second communication circuit 430_*b* communicable with the second charging device 201*b*, and the Nth communication circuit 430_*n* communicable with the Nth charging device 201*n*. The control circuit 431 may control the plurality of communication circuits 430 *a* to 430_*n* to collect information about a connection state of each of the charging devices 201*a* to 201*n* respectively connected to the plurality of ports 101_*a* to 101_*n*, a type of each of the charging devices 201*a* to 201*n*, and charging power capacity of each of the charging devices 201*a* to 201*n*. The control circuit 431 may request each of the plurality of charging devices 201*a* to 201*n* to supply a predetermined charging power depending on a charging power capacity characteristic of at least one charging device connected to at least one of the plurality of ports 101_*a* to 101_*n*.

The charging unit 420 may include a charging control switch block 423, a first charging circuit 411, and a second charging circuit 412. The charging control switch block 423 may be connected with the plurality of ports 101_*a* to 101_*n*. The charging control switch block 423 may connect selected ones of the plurality of ports 101_*a* to 101_*n* to the first charging circuit 411 and selected other ones of the plurality of ports to the second charging circuit 412. The charging control switch block 423 may connect a specific port to the first charging circuit 411 or the second charging circuit 412 in response to control of the control circuit 431.

The first charging circuit 411 may charge the battery 140 based on a battery charging power (or an input power) of the first charging circuit 411, corresponding to an input voltage of a predetermined range and an input current of the predetermined range. For example, the input voltage may be 3 V to 20 V (may be changed according to a physical characteristic of the first charging circuit 411) in the predetermined range, and an input current may be set for each input voltage. Similarly, the second charging circuit 412 may charge the battery 140 based on a battery charging power (or an input power) of the second charging circuit 412, corresponding to an input voltage of a predetermined range and an input current of the predetermined range. The input voltage may be 1 V to 25 V (may be changed according to a physical characteristic of the second charging circuit 412) in the predetermined range, and an input current may be set for each input voltage.

If a specific charging device is connected to a specific port, the control circuit 431 may request the connected charging device to supply a maximum charging power corresponding to battery charging power capacity of the first charging circuit 411 (or the second charging circuit 412) among a variety of charging power capacity providable from the connected charging device. If charging power capacity of a charging device is lower than the battery charging power capacity of the first charging circuit (or the second charging circuit 412), the control circuit 431 may request the charging device to supply a charging voltage suitable for the battery charging power of the first charging circuit 411 (or the second charging circuit 412) and a maximum charging current in the charging voltage.

If the plurality of charging devices 201*a* to 201*n* are connected, the control circuit 431 may first select a charging device having charging power capacity corresponding to charging power capacity of the first charging circuit 411 (or the second charging circuit 412) and may charge the battery 140 with the charging power capacity of the selected charging device. Alternatively, the control circuit 431 may select charging devices, each having the same charging voltage as an input voltage of the first charging circuit 411 (or the second charging circuit 412) among charging voltages of the plurality of charging devices 201*a* to 201*n* (the same charging voltage as an input voltage set for a charging device first connected) and may request the selected charging devices to divide and supply a charging current corresponding to an input current. In this operation, the control circuit 431 may change a charging voltage of a charging device first connected and may select a common charging voltage of the plurality of charging devices 201*a* to 201*n*, thus requesting the plurality of charging devices 201*a* to 201*n* such that the sum of charging currents providable by the selected common charging voltage is a battery charging power of a charging circuit. If it is impossible to change an input voltage of the charging circuit, the control circuit 431 may request charging devices, each having the same charging voltage as an input voltage, to supply a charging current.

If the first charging circuit 411 and the second charging circuit 412 have different input voltages to the battery 140, the control circuit 431 may connect charging devices, each having a charging voltage suitable for each of the first and second charging circuits 411 and 412, to each of the first and second charging circuits 411 and 412. Each of the first charging circuit 411 and the second charging circuit 412 may have an input voltage and current of the predetermined range. In this case, according to control of the control circuit 431, input voltages (or battery charging voltages) of the first charging circuit 411 and the second charging circuit 412 may be set to be different from each other or be the same as each other. A maximum value of the sum of input currents of the first charging circuit 411 and the second charging circuit 412 may be determined according to capacity and a characteristic of the battery 140.

Figure 5:
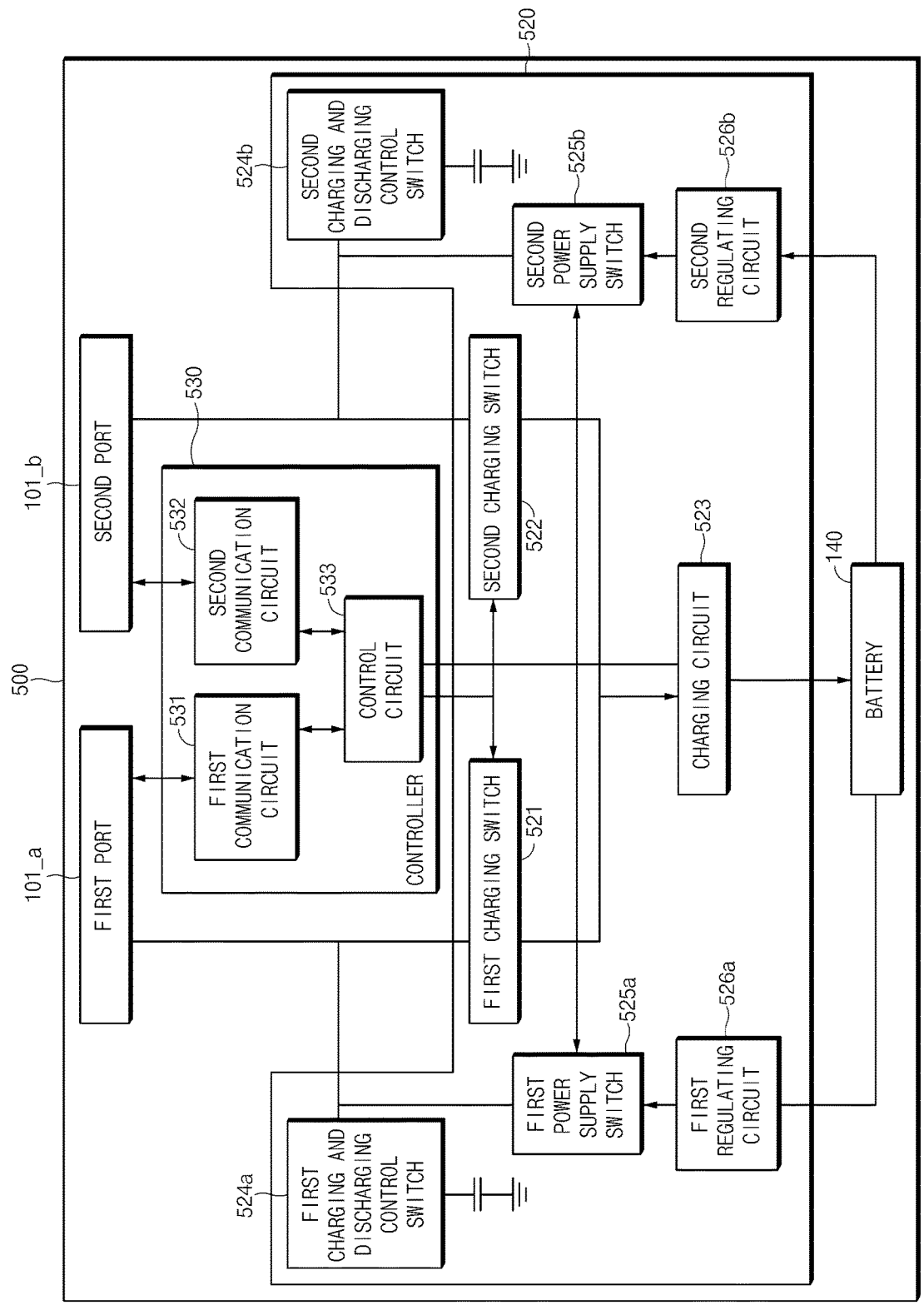
FIG. 5 is a block diagram illustrating an example of a charging and discharging system of an electronic device according to an embodiment of the present disclosure.

FIG. 5 is a block diagram illustrating an example of a charging and discharging system of an electronic device according to an embodiment of the present disclosure.

Referring to FIG. 5, an electronic device 500 may include a first port 101_a, a second port 101_b, a controller 530, a charging unit 520, and a battery 140. The first port 101_a and the second port 101_b may be substantially the same or similar to a first port 101_a and a second port 101_b described above with reference to FIG. 2. For example, an external device may be connected to the first port 101_a and the second port 101_b.

The controller 530 may include a first communication circuit 531, a second communication circuit 532, and a control circuit 533. The first communication circuit 531 may establish a communication channel with the external device connected with the first port 101_a and may receive information associated with the external device. The second communication circuit 532 may establish a communication channel with the external device connected with the second port 101_b and may receive information associated with the external device. The control circuit 533 may receive power from the external device connected to the first port 101_a and the second port 101_b or may supply power to the external device. Additionally, the first communication circuit 531 or second communication circuit 532 can determine whether the external device connected to the ports 101_a, 101_b are power consuming devices.

The charging unit 520 may include a first charging switch 521, a second charging switch 522, a first charging and discharging control switch 524a, a second charging and discharging control switch 524b, a first power supply switch 525a, a second power supply switch 525b, a first regulating circuit 526a, a second regulating circuit 526b, and a charging circuit 523.

When the external device(s) are charging devices (such as 201 in FIG. 2), charging switches 521 and 522 control the electrical path to the battery and the charging circuit 523 controls the amount of the power that each external device provides the battery.

When the external device(s) are power consuming devices (such as 233), the regulating circuits 526a and 526b control the amount of battery power that is provided to the power consuming device and power supply switches 525a, 525b control the electrical path to the battery 140. Charging and Discharging Control Switches 524a, 524b discharge voltage when an external device is either connected or disconnected.

The first charging switch 521 may be located between the first port 101_a and the charging circuit 523 and may be turned on/closed or off/opened according to control of the control circuit 533. The first charging switch 521 may be operated according to a manner described with reference to FIG. 2. The second charging switch 522 may be located between the second port 101_b and the charging circuit 523 and may be turned on/closed or off/opened according to control of the control circuit 533. The second charging switch 522 may be operated according to a manner described with reference to FIG. 2.

The first regulating circuit 526a may be connected to the battery 140, may receive power of the battery 140, and may regulate the received power to a power of a specified level. If a power consuming device is connected to the first port 101_a, the first regulating circuit 526a may transmit power from the battery 140 to power consuming device. The second regulating circuit 526b may be connected to the battery 140, may receive power of the battery 140, and may regulate the received power to a power of a specified level. If the external device corresponding to the power consuming device is connected to the second port 101_b, the second regulating circuit 526b may convert power supplied from the battery 140 into power necessary for the external device and may supply the converted power.

The first power supply switch 525a may be located between the first port 101_a and the first regulating circuit 526a. If the power consuming device is connected to the first port 101_a, the first power supply switch 525a may be closed according to control of the control circuit 533. If a charging device is connected to the first port 101_a, the first power supply switch 525a may be opened according to control of the control circuit 533.

The second power supply switch 525b may be located between the second port 101_b and the second regulating circuit 526b. If the power consuming device is connected to the second port 101_b, the second power supply switch 525b may be closed according to control of the control circuit 533. If a charging device is connected to the second port 101_b, the second power supply switch 525b may be opened according to control of the control circuit 533.

The first charging and discharging control switch 524a may be connected between the first power supply switch 525a and the first port 101_a (or the first charging switch 521). When the connection of the charging device or the external device to the first port 101_a is released or changed, the first charging and discharging control switch 524a may be closed to discharge voltage supplied to the first port 101_a. In this regard, a capacitor of a specified capacitance may be connected to a lower portion of the second charging and discharging control switch 524b. The capacitor may be grounded.

The second charging and discharging control switch 524b may be connected between the second power supply switch 525b and the second port 101_b (or the second charging switch 522). When the connection of the charging device or the external device to the second port 101_b is released or changed, the second charging and discharging control switch 524b may be closed to discharge voltage supplied to the second port 101_b. In this regard, a capacitor of a specified capacitance may be connected to a lower portion of the second charging and discharging control switch 524b. The capacitor may be grounded.

The charging circuit 523 may be connected to the first charging switch 521 and the second charging switch 522. If a charging device is connected to the first port 101_a or the second port 101_b, the charging circuit 523 may charge the battery 140 with a charging power provided from at least one charging device. If the power consuming device is connected to a port, part of power supplied to the battery 140 at the charging circuit 523 may be supplied to a regulating circuit. In the shown drawing, an embodiment is exemplified as there is the one charging circuit 523. However, embodiments of the present disclosure are not limited thereto. For example, the electronic device 500 may include a plurality of charging circuits, and each of the plurality of charging circuits may be electrically connected to each port via each of charging switches. For example, the plurality of charging circuits may include a first charging circuit located between the first charging switch 521 and the battery 140 and a second charging circuit located between the second charging switch 522 and the battery 140.

The control circuit 533 may select charging devices, each having the same charging voltage as an input voltage (or a battery charging voltage) of the charging circuit 523 among charging voltages of a plurality of charging devices (the same charging voltage as an input voltage set for a charging device first connected) and may request the selected charging devices to divide and supply a charging current corresponding to an input current. In this operation, the control circuit 533 may change a charging voltage of the charging device first connected and may select a common charging voltage of the plurality of charging devices, thus requesting the plurality of charging devices such that the sum of charging currents providable by the selected common charging voltage is a battery charging power of the charging circuit 523. If it is impossible to change an input voltage of the charging circuit 523, the control circuit 533 may request charging devices, each having the same charging voltage as an input voltage, to supply a charging current.

Figure 6:
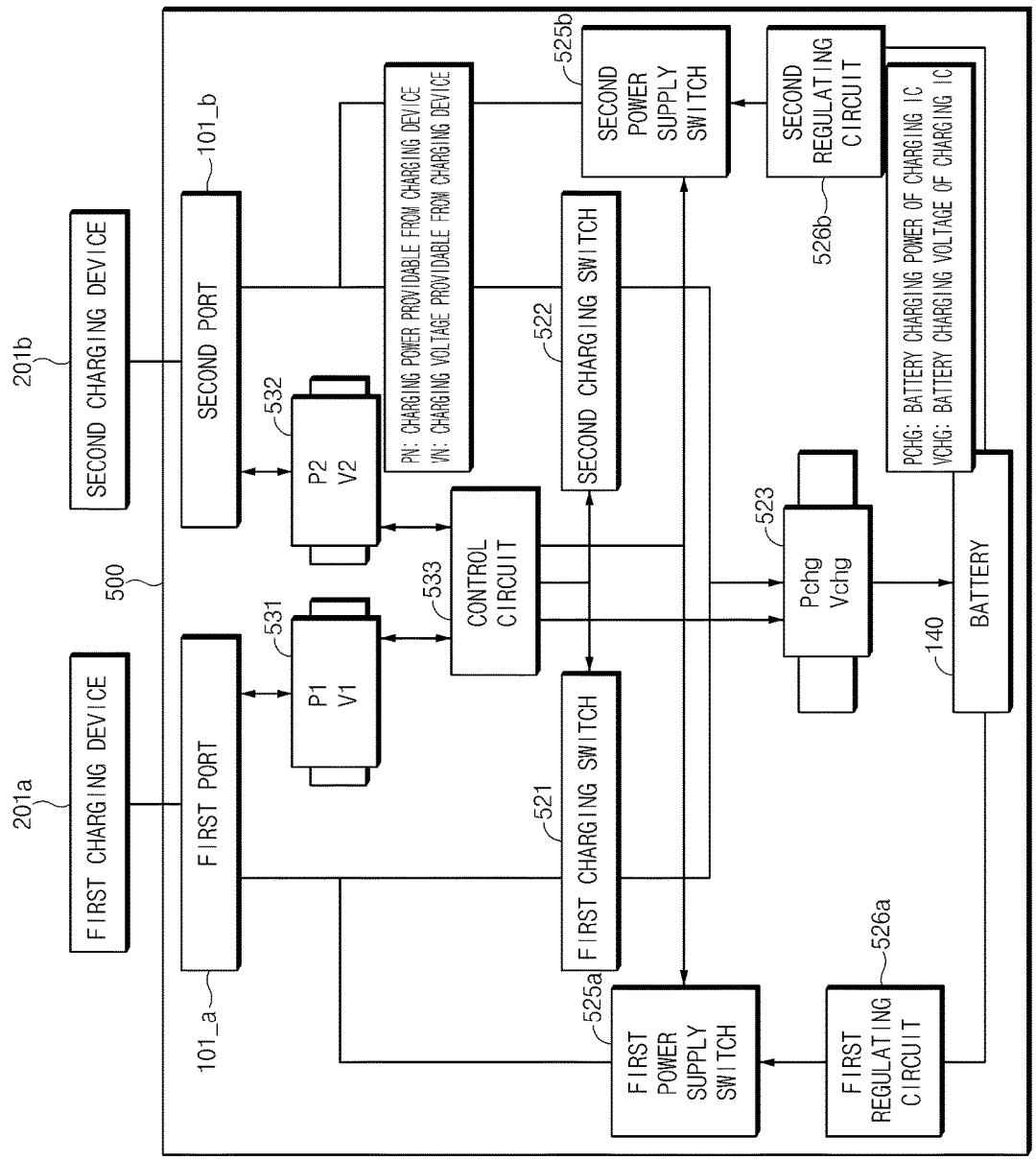
FIG. 6 is a block diagram illustrating an example of operating a charging and discharging system of an electronic device according to an embodiment of the present disclosure.

FIG. 6 is a block diagram illustrating an example of operating a charging and discharging system of an electronic device according to an embodiment of the present disclosure.

Referring to FIG. 6, an electronic device 500 may include a first port 101_a, a second port 101_b, a first communication circuit 531, a second communication circuit 532, a control circuit 533, a first charging switch 521, a second charging switch 522, a charging circuit 523, and a battery 140, which are associated with charging. Alternatively, the electronic device 500 may include the first port 101_a, the second port 101_b, the first communication circuit 531, the second communication circuit 532, the control circuit 533, a first power supply switch 525a, a first regulating circuit 526a, a second power supply switch 525b, a second regulating circuit 526b, and the battery 140, which are associated with discharging.

A first charging device 201a may be connected to the first port 101_a of the electronic device 500, and a second charging device 20b may be connected to the second port 101_b. The first communication circuit 531 may collect information P1 and V1 associated with a charging power of the first charging device 201a in response to control of the control circuit 533. P1 may be maximum charging power capacity providable from the first charging device 201a, and V1 may be a charging voltage providable from the first charging device 201a. Similarly, the second communication circuit 532 may collect information P2 and V2 associated with a charging power of the second charging device 201b in response to control of the control circuit 533. P2 may be maximum charging power capacity providable from the second charging device 201b, and V2 may be a charging voltage providable from the second charging device 201b. In addition, if an Nth charging device is connected to an Nth port, an Nth communication circuit may collect information Pn and Vn associated with a maximum charging power capacity and charging voltage of the Nth charging device in response to control of the control circuit 533. Further, the Nth communication circuit may collect current information in response to control of the control circuit 533.

The control circuit 533 may differently or equally set a charging power, a charging voltage, or a charging current to be provided from each of charging devices based on types of the charging devices and the number of the charging devices connected to ports for one charging circuit or each of a plurality of charging circuits. For example, if the first charging device 201a is first connected to the first port 101_a, the control circuit 533 may request the first charging device 201a to supply a charging power based on information Pchg and Vchg associated with a battery charging power of the charging circuit 523. For example, if P1 (charging power capacity of the first charging device 201a) is higher than Pchg (battery charging power capacity of the charging circuit 523), the control circuit 533 may request the first charging device 201a to supply a charging power, corresponding to Pchg, having Vchg (a battery charging voltage of the charging circuit 523). If P1≥Pchg and if V1=Vchg, the first charging device 201a may supply a charging power of a Pchg and V1 state to the charging circuit 523 depending on control of the control circuit 533. According to various embodiments, if P1≤Pchg and if V1=Vchg, the first charging device 201a may supply the charging power of the P1 and V1 state to the charging circuit 523 depending on control of the control circuit 533.

In a state where the charging power of the P1 and V1 state is supplied to the charging circuit 523 after the first charging device 201a is first connected, if the second charging device 20b is connected to the second port 101_b, the control circuit 533 may perform various types of charging control depending on a level of P2. For example, if the second charging device 20b is connected in a state where P1≥Pchg, the control circuit 533 may maintain a closed state of the first charging switch 521 and may maintain a open state of the second charging switch 522. Thus, the charging power of the Pchg and V1 state of the first charging device 201a may be supplied to the charging circuit 523, and the second charging device 20b second charging switch 522 is opened, thereby preventing second charging device 20b from charging the battery 140.

According to an embodiment, if P1≤Pchg, the control circuit 533 may collect a Pdelta (=Pchg−P1) value, may use the same voltage as V1 among powers providable from the second charging device 201b, and may search for a value close to the Pdelta value (approx. Pdelta), thus requesting the second charging device 20b to supply approx. Pdelta. For example, if Pchg is 40 W, if Vchg is 15 V, if P1 is 30 W, and if V1 is 15 V, the first charging device 201a may supply a power of 30 W to the charging circuit 523. In this operation, P2 may correspond to a charging power of any one of 10 W, 15 W, 20 W, or 30 W, and V2 may need 15 V, 15 V, 15 V, or 15V, respectively for each charging power. The control circuit 533 may collect information about P2 and V2 from the second charging device 201b and may request the second charging device 20b to supply the same charging voltage as V1, corresponding to Pdelta, for supplying a current charging power. Thus, the second charging device 20b may supply a charging power of P2 (e.g., 10 W) and V2 (e.g., 15 V) to the charging circuit 523. According to various embodiments, if a charging power P2 providable from a charging voltage of 15 V is 9 W or 11 W, the control circuit 533 may request the second charging device 20b to supply the charging power of 9 W. In this operation, the control circuit 533 may close the second charging switch 522.

According to various embodiments, P2 of the second charging device 201b connected after the first charging device 201*a* may be set to a charging power of any one of 10 W, 15 W, 20 W, 30 W, 40 W, or 50 W, and V2 may be set to 15 V, 15 V, 15 V, 15 V, 20 V, or 25 V, respectively for each charging power. The control circuit 533 may collect information associated with a charging power of the second charging device 20*b* and may request the second charging device 20*b* to supply a charging power of P2 (e.g., 40 W) and V2 (e.g., 20 V), thus stopping the charging operation of the first charging device 201*a*. The control circuit 533 may change Vchg of the charging circuit 523 to 20 V and may establish a power path (e.g., a path where the first charging switch 521 is opened and where the second charging switch 522 is closed) to transmit a charging power where P2 (e.g., 40 W) is Pchg to the charging circuit 523. If a charging voltage of P2 (e.g., 40 W) is 15 V, the charging circuit 523 may maintain a previous charging voltage of 15 V.

Figure 7:
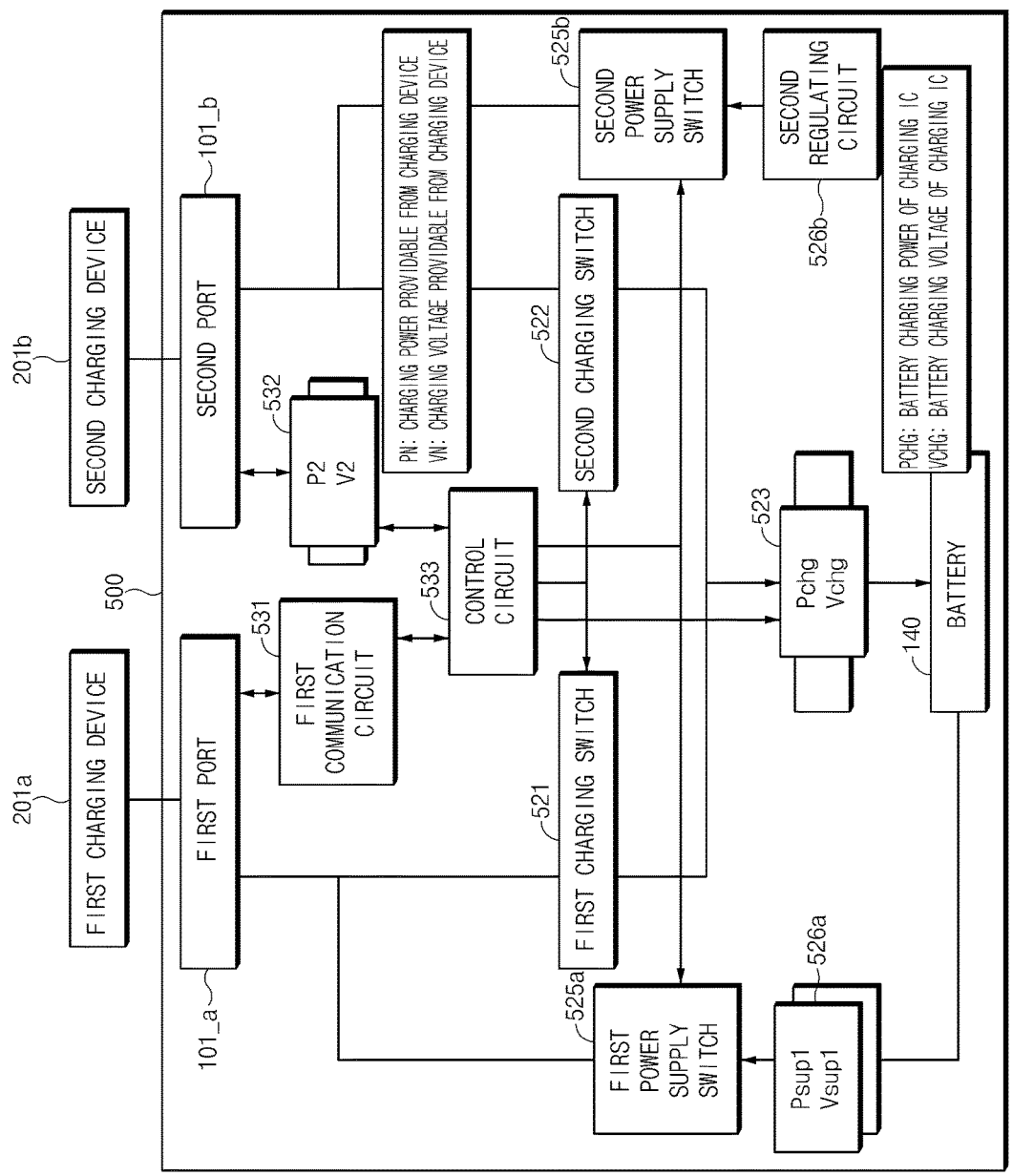
FIG. 7 is a block diagram illustrating another example of operating a charging and discharging system of an electronic device according to an embodiment of the present disclosure.

According to various embodiments, although P2≥P1, a charging operation of the first charging device 201*a* may be maintained according to control of the control circuit 533, and the control circuit 533 may request the second charging device 20*b* to supply Pdelta. The control circuit 533 may determine power of a small difference with Pchg between a single charging power of P2 and a total power of P1+P2 based on the charging circuit 523, a temperature of a port, a charging current, a charging voltage, or the like. Alternatively, the control circuit 533 may determine a level of power to be supplied in a direction where the sum of charging currents is lower and where a charging voltage is high. For example, if the single charging power of P2 is 40 W and 20 V and if P1+P2 are 40 W and 15 V, the control circuit 533 may control the first charging device 201*a* and the second charging device 20*b* to supply the charging power of P1+P2. If charging powers of a plurality of charging devices are used, heat generated in a charging process may be dissipated. FIG. 7 is a block diagram illustrating another example of operating a charging and discharging system of an electronic device according to an embodiment of the present disclosure.

Referring to FIG. 7, an electronic device 500 may include a first port 101_*a*, a second port 101_*b*, a first communication circuit 531, a second communication circuit 532, a control circuit 533, a first charging switch 521, a second charging switch 522, a charging circuit 523, and a battery 140, which are associated with charging. Alternatively, the electronic device 500 may include the first port 101_*a*, the second port 101_*b*, the first communication circuit 531, the second communication circuit 532, the control circuit 533, a first power supply switch 525*a*, a first regulating circuit 526*a*, a second power supply switch 525*b*, a second regulating circuit 526*b*, and the battery 140, which are associated with discharging.

As described with reference to FIG. 6, according to an embodiment, a first charging device 201*a* is connected to the first port 101_*a* and if a second charging device 20*b* is connected to the second port 101_*b*, a first charging power of the first charging device 201*a* and a second charging power of the second charging device 20*b* may be supplied to the charging circuit 523 according to control of the control circuit 533. If the first charging device 201*a* connected to the first port 101_*a* is disconnected from the first port 101_*a*, the control circuit 533 may request the second charging device 20*b* to supply a charging power corresponding to Pchg and Vchg. For example, if the connection of the first charging device 201*a* is released while a charging power having an amount of current of a first level is supplied in a condition where P2 is 10 W among 10 W, 15 W, 20 W, 30 W, 40 W, and 50 W and where V2 is 15 V, a charging power having an amount of current of a second level (an amount of current of the same or different level from the first level) in a condition of 40 W corresponding to Pchg and 20 V may be supplied to the charging circuit 523 depending on control of the control circuit 533. According to another example, if the connection of the first charging device 201*a* is released, 40 W corresponding to Pchg and a charging current corresponding to 2 A may be supplied to the charging circuit 523 depending on control of the control circuit 533.

After the first charging device 201*a* is disconnected, a power consuming device 203 of FIG. 1 may be connected to the first port 101_*a*. The control circuit 533 may collect power consumption information of the connected power consuming device 203 using the first communication circuit 531. For example, a power consumption of the power consuming device 203 is 10 W, and a voltage of the power consuming device 203 may be 15 V. The control circuit 533 may request the second charging device 20*b* to supply a charging power for charging the battery 140 concurrently with supplying a power of the power consuming device 203. For example, the control circuit 533 may request the second charging device 20*b* to supply a charging power of 50 W and 25 V. The control circuit 533 may change Vchg to 25 V depending on control of the control circuit 533. Power corresponding to 40 W in 50 W supplied to the control circuit 533 may be used to charge the battery 40, and the power of 10 W may be supplied to the first regulating circuit 526*a*. In this operation, the control circuit 533 may opened the first charging switch 521 and may maintain a closed state of the second charging switch 522.

The first regulating circuit 526*a* may generate power corresponding to Psupl (10 W) and Vsupl (15 V) and may supply the generated power to the first port 101*a*, in connection with supplying a power of the power consuming device 203. In this operation, the first regulating circuit 526*a* may change a power of 25 V and 10 W to a power of 15 V and 10 W and may supply the converted power to the first port 101_*a*. The control circuit 533 may closed the first power supply switch 525*a* to supply power to the power consuming device 203. If the connection of the power consuming device 203 to the first port 101_*a* is released, the control circuit 533 may request the second charging device 20*b* to supply a charging power corresponding to Pchg and Vchg.

Figure 8:
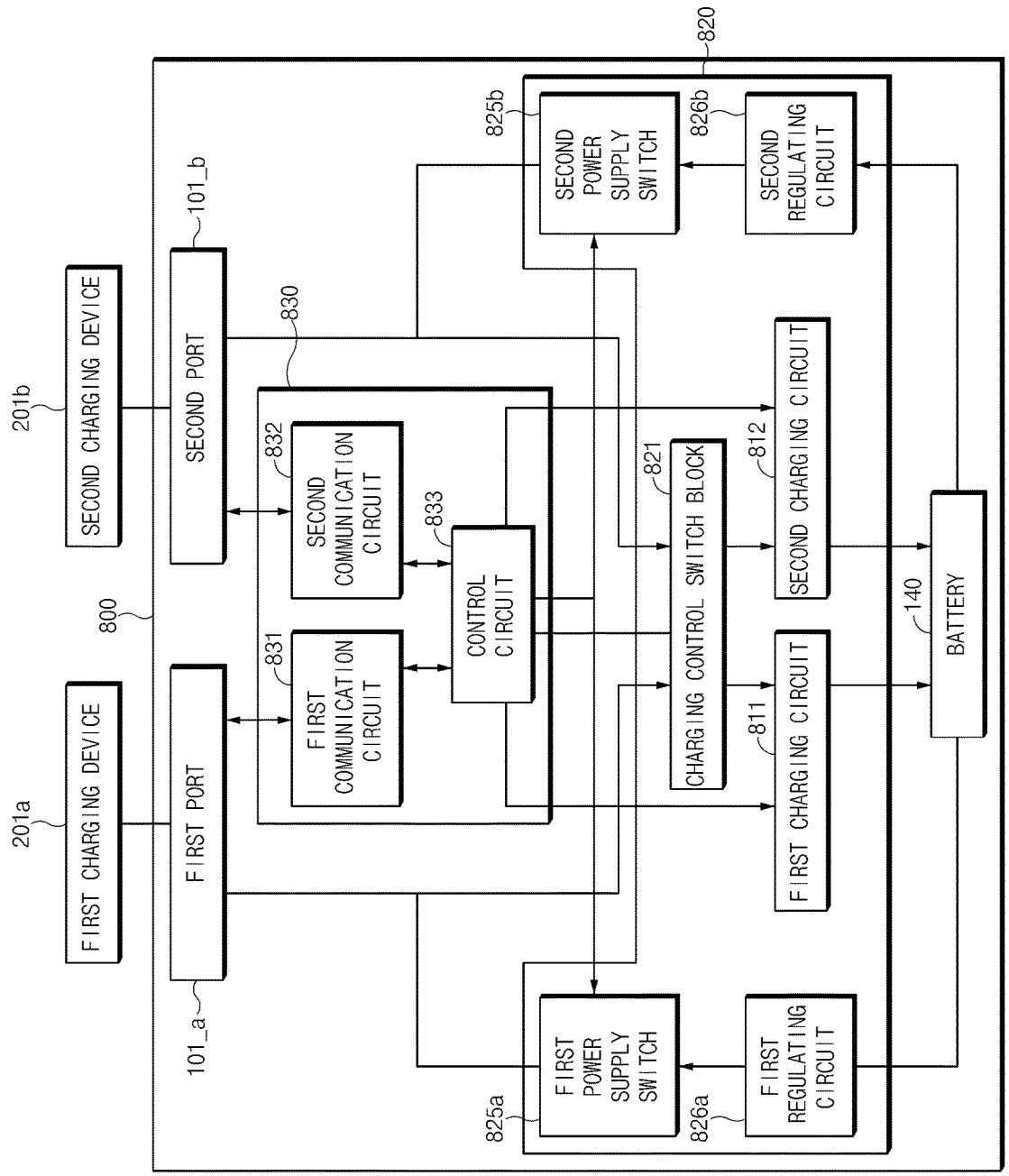
FIG. 8 is a block diagram illustrating another example of a charging and discharging system of an electronic device according to an embodiment of the present disclosure.

FIG. 8 is a block diagram illustrating another example of a charging and discharging system of an electronic device according to an embodiment of the present disclosure.

Referring to FIG. 8, an electronic device 800 may include a first port 101_*a* to which a first charging device 201*a* may be connected, a second port 101_*b* to which a second charging device 20*b* may be connected, a controller 830, a charging unit 820, and a battery 140. The controller 830 may include a first communication circuit 831, a second communication circuit 832, and a control circuit 833. The charging unit 820 may include a first power supply switch 825*a*, a first regulating circuit 826*a*, a second power supply switch 825*b*, a second regulating circuit 826*b*, a first charging circuit 811, a second charging circuit 812, and a charging control switch block 821.

The charging control switch block 821 may connect between the first port 101_*a* and the first charging circuit 811 or the second charging circuit 812 in response to control of the control circuit 833. Alternatively, the charging control switch block 821 may connect between the second port 101_*b* and the first charging circuit 811 or the second charging circuit 812 in response to control of the control circuit 833.

The first charging circuit 811 may be located between the charging control switch block 821 and the battery 140 and may supply any one of a charging power supplied from the first charging device 201*a* connected to the first port 101_*a* and a charging power supplied from the second charging device 20*b* connected to the second port 101_*b* to the battery 140. The second charging circuit 812 may be located between the charging control switch block 821 and the battery 140 and may receive any one of a charging power supplied from the first charging device 201*a* connected to the first port 101_*a* and a charging power supplied from the second charging device 20*b* connected to the second port 101_*b*, thus supplying the received charging power to the battery 140. A range of an input power providable from the first charging circuit 811 and a range of an input voltage may be the same or different from a range of an input power providable from the second charging circuit and a range of an input voltage. If having different input powers and different input voltages, the control circuit 833 may match a charging circuit in response to charging power capacity of a charging device connected to a port. For example, if charging power capacity and a charging voltage of the first charging device 201*a* connected to the first port 101_*a* are matched with the second charging circuit 812, the control circuit 833 may control the charging control switch block 821 to establish a charging path including the first port 101_*a*, the charging control switch block 821, and the second charging circuit 812. Alternatively, if charging power capacity and a charging voltage of the first charging device 201*a* connected to the first port 101_*a* are matched with the first charging circuit 811, the control circuit 833 may control the charging control switch block 821 to establish a charging path including the first port 101_*a*, the charging control switch block 821, and the first charging circuit 811.

According to various embodiments, the control circuit 833 may charge the battery 140 using only the first charging circuit 811. For example, if the first charging device 201*a* which supplies a first charging power and a first charging voltage is connected to the first port 101_*a* and if the second charging device 20*b* is connected to the second port 101_*b* which supplies a second charging power and a second charging voltage, if the first charging power and the second charging power correspond to a battery charging power (or an input power) of the first charging circuit 811, the control circuit 833 may control the charging control switch block 821 to supply a charging power of the first charging device 201*a* and a charging power of the second charging device 20*b* to the first charging circuit 811 (or the second charging circuit 812). Alternatively, the control circuit 833 may alternately operate the first charging circuit 811 or the second charging circuit 812 at a predetermine time period to reduce a charging burden through one charging circuit.

According to various embodiments, an electronic device may include a plurality of ports, a battery configured to receive a charging power through at least one of the plurality of ports, a control circuit configured to control charging of the battery using power from a plurality of charging devices connected to the plurality of ports, a charging circuit configured to charge the battery using power supplied from the plurality of charging devices, and a plurality of communication circuits configured to communicate with the plurality of charging devices, wherein the control circuit is configured to be electrically connected with the plurality of communication circuits and the charging circuit and set (or allow) charging power capacity of each of the plurality of charging devices and battery charging power capacity of the charging circuit.

According to various embodiments, wherein the control circuit may be configured to verify the charging power capacity of each of the plurality of charging devices through the plurality of communication circuits, and set (or allow) the battery charging power capacity of the charging circuit.

According to various embodiments, wherein the control circuit may be configured to set the charging power capacity of each of the plurality of charging devices based on the battery charging power capacity of the charging circuit.

According to various embodiments, wherein the control circuit may be configured to set the charging power capacity of each of the plurality of charging devices to be greater than or equal to the battery charging power capacity of the charging circuit.

According to various embodiments, wherein the control circuit may be configured to, if a second charging device is connected to a second port among the plurality of ports while supplying a charging power from a first charging device connected to a first port among the plurality of ports to the battery, set (or allow) charging power capacity of the second charging device in response to charging power capacity of the first charging device.

According to various embodiments, wherein the control circuit may be configured to, if the charging power capacity of the first charging device is less than the battery charging power capacity of the charging circuit, request the second charging device to supply a difference value between the charging power capacity of the first charging device and the battery charging power capacity.

According to various embodiments, wherein the control circuit may be configured to, If the charging power capacity of the first charging device is less than the battery charging power capacity of the charging circuit and if the charging power capacity of the second charging device is greater than or equal to the battery charging power capacity of the charging circuit, stop supplying the charging power of the first charging device and charge the battery through the second charging device.

According to various embodiments, wherein the control circuit may be configured to, if the charging power capacity of the first charging device and the charging power capacity of the second charging device are less than the battery charging power capacity of the charging circuit, adjust the charging power capacity of the first charging device and the charging power capacity of the second charging device such that the sum of part of the charging power capacity of the first charging device and part of the charging power capacity of the second charging device is the same as the battery charging power capacity of the charging circuit or are higher than the battery charging power capacity of the charging circuit by a specified level.

According to various embodiments, wherein the control circuit may be configured to request the first charging device and the second charging device to supply a charging voltage of each of the first charging device and the second charging device such that the charging voltage of the first charging device and the charging voltage of the second charging device are the same as each other or are increased to a specified level or more.

According to various embodiments, wherein the control circuit may be configured to charge the battery using the power from the plurality of charging devices connected to the plurality of ports, or supply power to at least one accessory device connected to the plurality of ports.

According to various embodiments, wherein the control circuit may be configured to, if a power consuming device is connected to a second port among the plurality of ports while supplying a first charging power from a first charging device connected to a first port among the plurality of ports to the battery, request the first charging device to supply a second charging power which is higher than the first charging power.

According to various embodiments, wherein the charging circuit may include one charging circuit connected with the plurality of ports.

According to various embodiments, wherein the charging circuit may include a plurality of charging circuits respectively connected with the plurality of ports.

According to various embodiments, wherein the at least one of the plurality of ports may have USB type C.

According to various embodiments, an electronic device may include a plurality of ports, a battery configured to receive a charging power through at least one of the plurality of ports, a plurality of communication circuits configured to communicate with a plurality of external devices, a control circuit configured to set power of each of the plurality of external devices connected to the plurality of ports, a charging circuit configured to charge the battery using the power, wherein the control circuit may be configured to receive power information of the plurality of external devices through the plurality of communication circuits, and set a charging mode of the charging circuit and charging power capacity of each of a plurality of charging devices.

Figure 9:
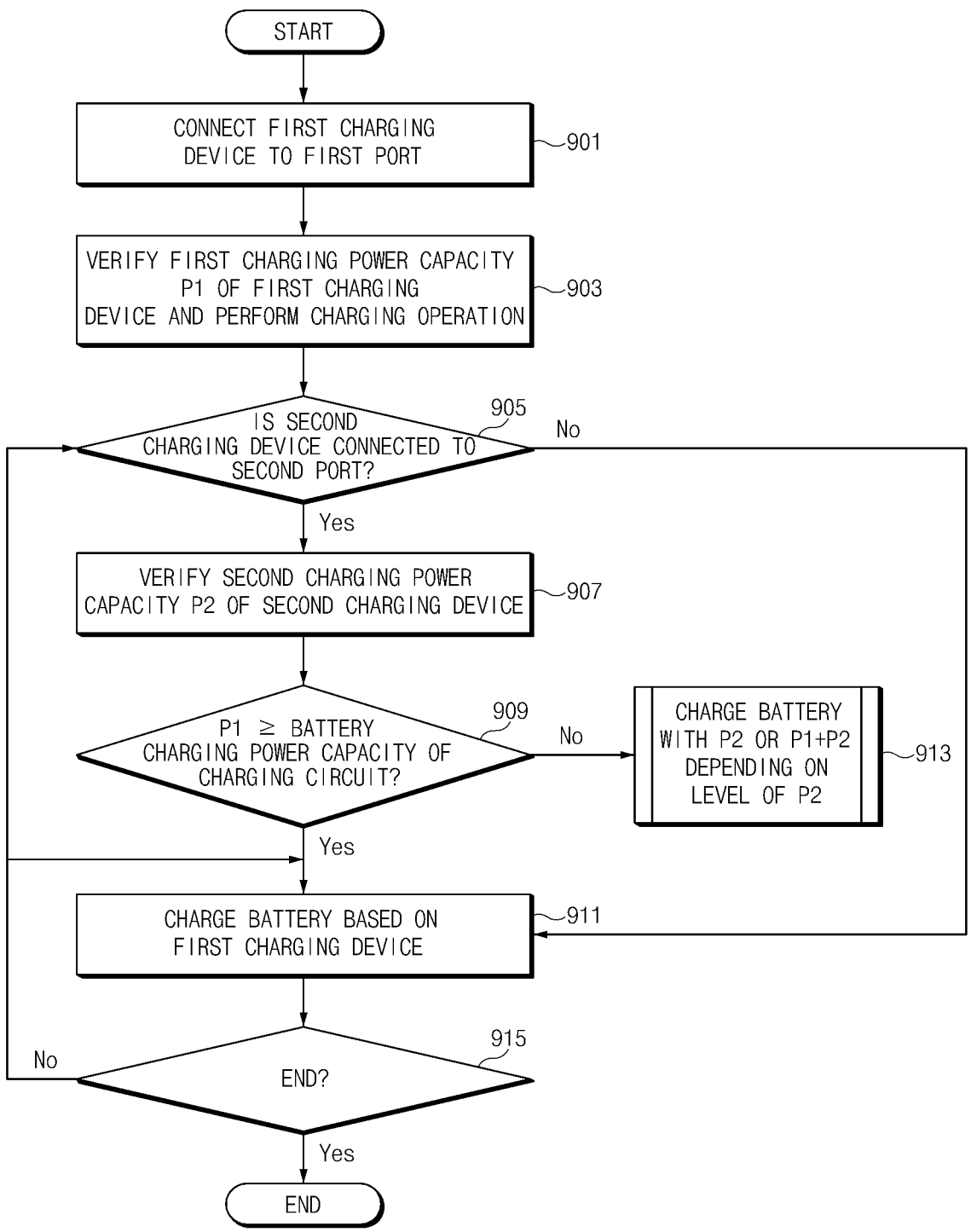
FIG. 9 is a flowchart illustrating an example of a charging control method according to an embodiment of the present disclosure.

FIG. 9 is a flowchart illustrating an example of a charging control method according to an embodiment of the present disclosure.

Referring to FIG. 9, in connection with the charging control method according to an embodiments of the present disclosure, in operation 901, the first charging device 201a is connected to the first port 101_a. A control circuit (133, 333, 431, 533, or 833, hereinafter, a description will be given relative to 133) may determine that a first charging device 201a is connected to a first port 101_a. For example, the control circuit 133 may determine whether the first charging device 201a is connected to the first port 101_a, through a change in pull-up voltage held on the first port 101_a or communication with the first charging device 201a connected to the first port 101_a.

In operation 903, the control circuit 133 may verify the first charging power capacity P1 of the first charging device 201a and may perform a charging operation based on the first charging power capacity P1. In this regard, the control circuit 133 may communicate with the first charging device 201a using a first communication circuit and may collect information associated with a charging power of the first charging device 201a. The control circuit 133 may request the first charging device 201a to supply a charging power suitable for a battery charging power Pchg and a battery charging voltage Vchg of a charging circuit (or an input voltage of the charging circuit).

In operation 905, the control circuit 133 may determine whether a second charging device 20b is connected to a second port 101_b. Determining whether the second charging device 20b is connected to the second port 101_b may be the same as determining whether the first charging device 201a is connected to the first port 101_a. If the second charging device 20b is connected, in operation 907, the control circuit 133 may verify second charging power capacity P2 of the second charging device 201b. In this regard, the control circuit 133 may communicate with the second charging device 20b using a second communication circuit and may collect information associated with a charging power of the second charging device 201b. If the second charging device 20b is not connected to the second port 101_b, operation 911 is performed as described below.

In operation 909, the control circuit 133 may determine whether P1 (the first charging power capacity) is greater than or equal to Pchg (battery charging power capacity) of the charging circuit. In operation 909, if P1 is greater than or equal to Pchg, in operation 911, the control circuit 133 may charge a battery 140 based on only the first charging device 201a. The second charging device 20b can be prevented from charging the battery 140 by opening a switch (122, 322, 522) in the electrical path from second charging device 210b and the battery 140. If P is less than Pchg in operation 909, in operation 913 (described in FIG. 10), the controller 130 may charge the battery 140 in a specified manner depending on a level of P2 (the second charging power capacity). For example, the control circuit 133 may charge the battery 140 with at least one of P1 or P2 or may charge the battery 140 with a charging power including at least part of P1 and at least part of P2.

In operation 915, if an event associated with ending the charging operation occurs (e.g., the first charging device 201a and the second charging device 20b are both disconnected or if the battery 140 is fully charged), the control circuit 133 may end the charging operation. If the charging operation is not completed, the control circuit 133 may branch to operation 905 depending on a previous operation state to perform the operation again from operation 905 or may branch to operation 911 to perform the operation again from operation 911. According to various embodiments, while a charging operation is performed based on the first charging device 201a and while the second charging device 20b has only a connection state, if the first charging device 201a is disconnected, the control circuit 133 may charge the battery 140 using the second charging device 201b.

Figure 10:
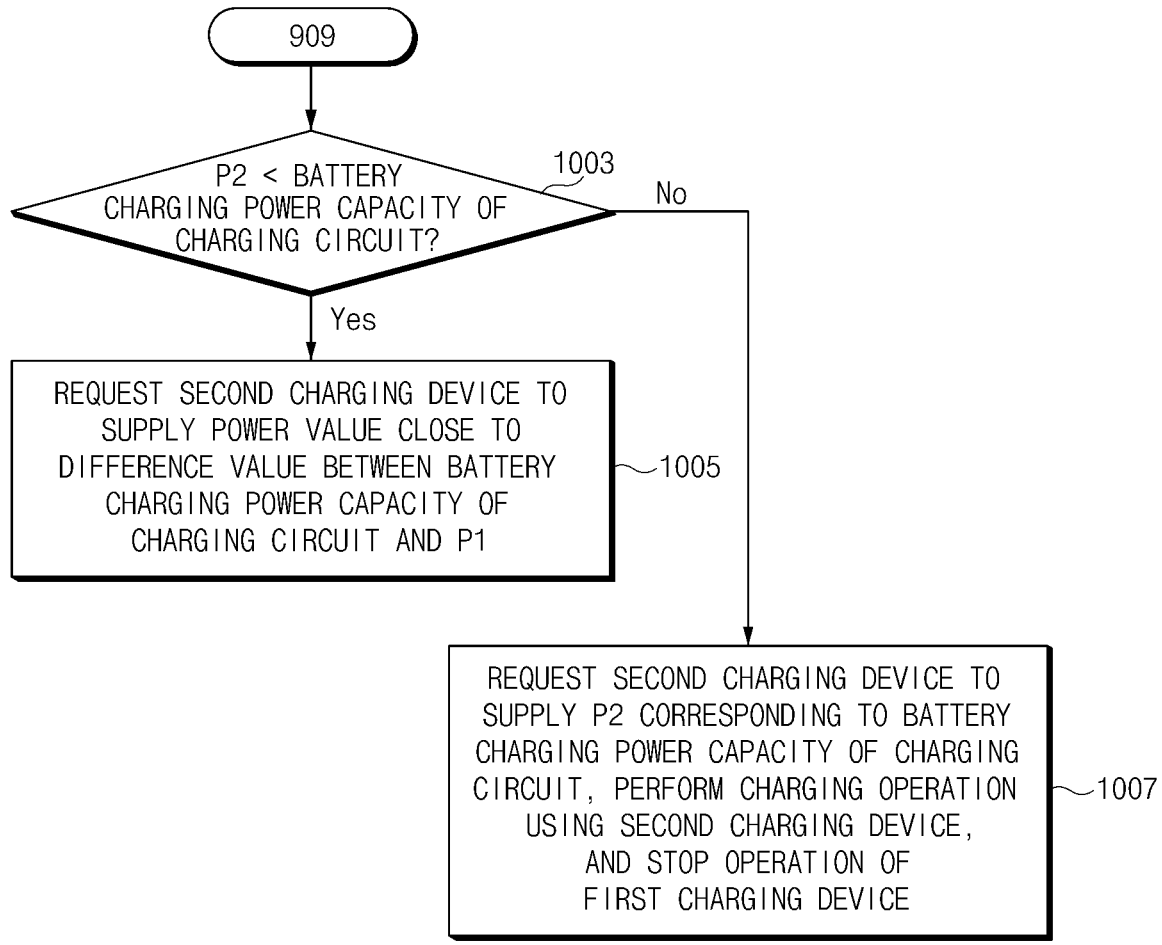
FIG. 10 is a flowchart illustrating an example of operating an electronic device associated with a charging control method according to an embodiment of the present disclosure.

FIG. 10 is a flowchart illustrating an example of operating an electronic device associated with a charging control method according to an embodiment of the present disclosure. FIG. 10 describes operation 913.

Referring to FIG. 10, in operation 1003, in a state where P1 (charging power capacity of the first charging device 201a) is less than battery charging power capacity of a charging circuit (the "No" condition to operation 909, in FIG. 9), the control circuit 133 may determine whether P2 (charging power capacity of the second charging device 201b) is less than the battery charging power capacity (e.g., Pchg) of the charging circuit. If P2 is less than the battery charging power capacity of the charging circuit, in operation 1005, the control circuit 133 may request the second charging device 20b to supply a power value close to a difference value (a battery charging power capacity reference difference value) between the battery charging power capacity of the charging circuit and P2. For example, if a voltage of the second charging device 20b is determined as a similar value to a battery charging voltage, the control circuit 133 may request the second charging device 20b to supply a current value to be close to the battery charging power capacity reference difference value of the charging circuit.

If P2 is greater than or equal to the battery charging power capacity of the charging circuit in operation 1003, in operation 1007, the control circuit 133 may request the second charging device 20b to supply P2 corresponding to the battery charging power capacity of the charging circuit and may perform a charging operation using the second charging device 201b. In this operation, the control circuit 133 may stop the operation of the first charging device 201a.

In the operation of supplying a charging power corresponding to the difference value (operation 1005), the control circuit 133 may request the second charging device 201b to supply the charging power corresponding to the difference value to request the second charging device 20b to supply the charging power based on a charging power and a charging voltage or current which are the most similar to a battery charging power and a battery charging voltage among various charging powers and various charging voltages providable from the second charging device 201b.

According to various embodiments, if P2 is greater than P1, the control circuit 133 may request the second charging device 20b to supply a charging power, such as Pchg, among charging powers providable from the second charging device 201b. In this operation, the control circuit 133 may opened a switch associated with the first charging device 201a and may closed a switch associated with the second charging device 201b.

In operation 1005, while maintaining charging of the first charging device 201a, the control circuit 133 may request the second charging device 20b to supply a difference value in which a charging power of the first charging device 201a is subtracted from a battery charging power.

As described above, the control circuit 133 may determine whether to use a single charging power of P2 or whether to use a total power of P1+P2, based on a charging circuit, a temperature of a connected port, a charging current or voltage, or the like and may determine power as a small difference value with a battery charging power. Alternatively, the control circuit 133 may set a level of power to be supplied in a direction where current is relatively low and where voltage is high, between a single charging power of P2 (or a single charging power of P1) and a total power of P1+P2.

Figure 11:
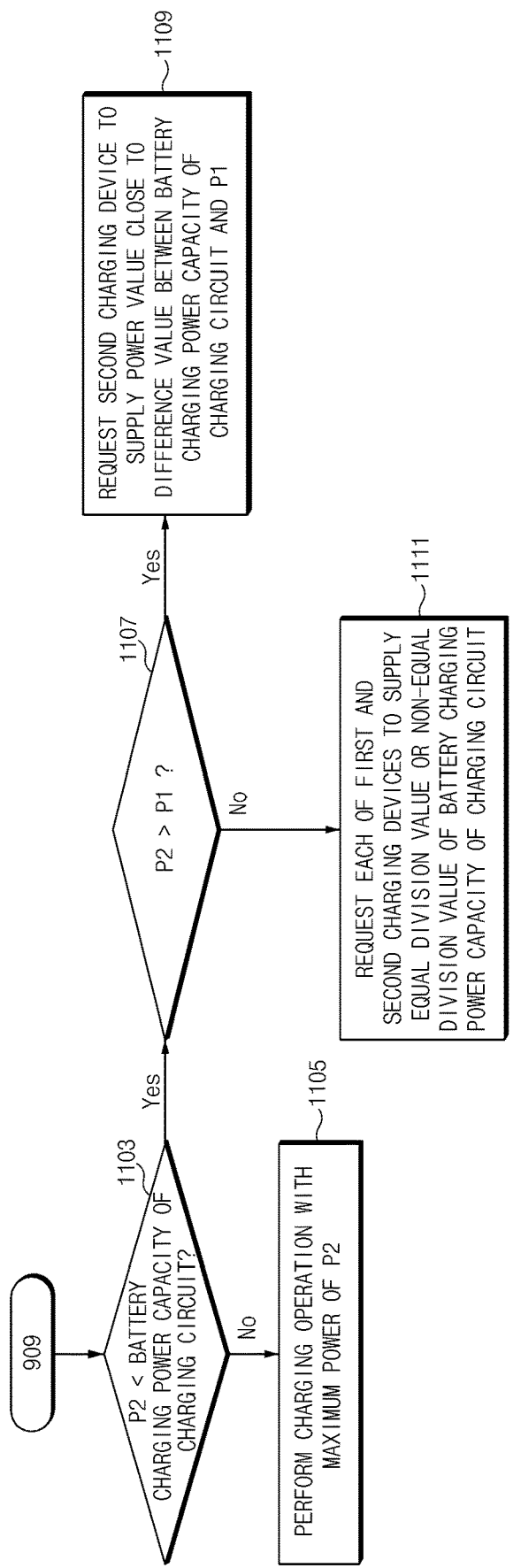
FIG. 11 is a flowchart illustrating another example of operating an electronic device associated with a charging control method according to an embodiment of the present disclosure.

FIG. 11 is a flowchart illustrating another example of operation 913 according to an embodiment of the present disclosure.

In operation 1103, in a state where P1 (charging power capacity of the first charging device 201) is less than battery charging power capacity of a charging circuit ("No" condition of 909), the control circuit 133 may determine whether P2 (charging power capacity of the second charging device 201b) is less than the battery charging power capacity of the charging circuit. If P2 is greater than or equal to the battery charging power capacity of the charging circuit, in operation 1105, the control circuit 133 may request the second charging device 20b to supply a charging power to perform a charging operation using a maximum power of P2 and may stop an operation of the first charging device 201a.

If P2 is less than the battery charging power capacity of the charging circuit, in operation 1107, the control circuit 133 may determine whether P2 is greater than P1 (e.g., the charging power capacity of the first charging device 201a).

If P2 is greater than P1, in operation 1109, the control circuit 133 may request the second charging device 20b to supply a power value close to (or the same as) a difference value between the battery charging power capacity of the charging circuit and P1. If P2 is not greater than P1 (or if P2 is lower than or equal to P1), in operation 1111, the control circuit 133 may request each of the first and second charging devices 201a and 201b to supply an equal division value or a non-equal division value of the battery charging power capacity of the charging circuit. According to another example, the controller 130 may request the first charging device 201a to supply a power value close to the difference value (a battery charging power capacity reference difference value) between the battery charging power capacity of the charging circuit and P2.

Figure 12:
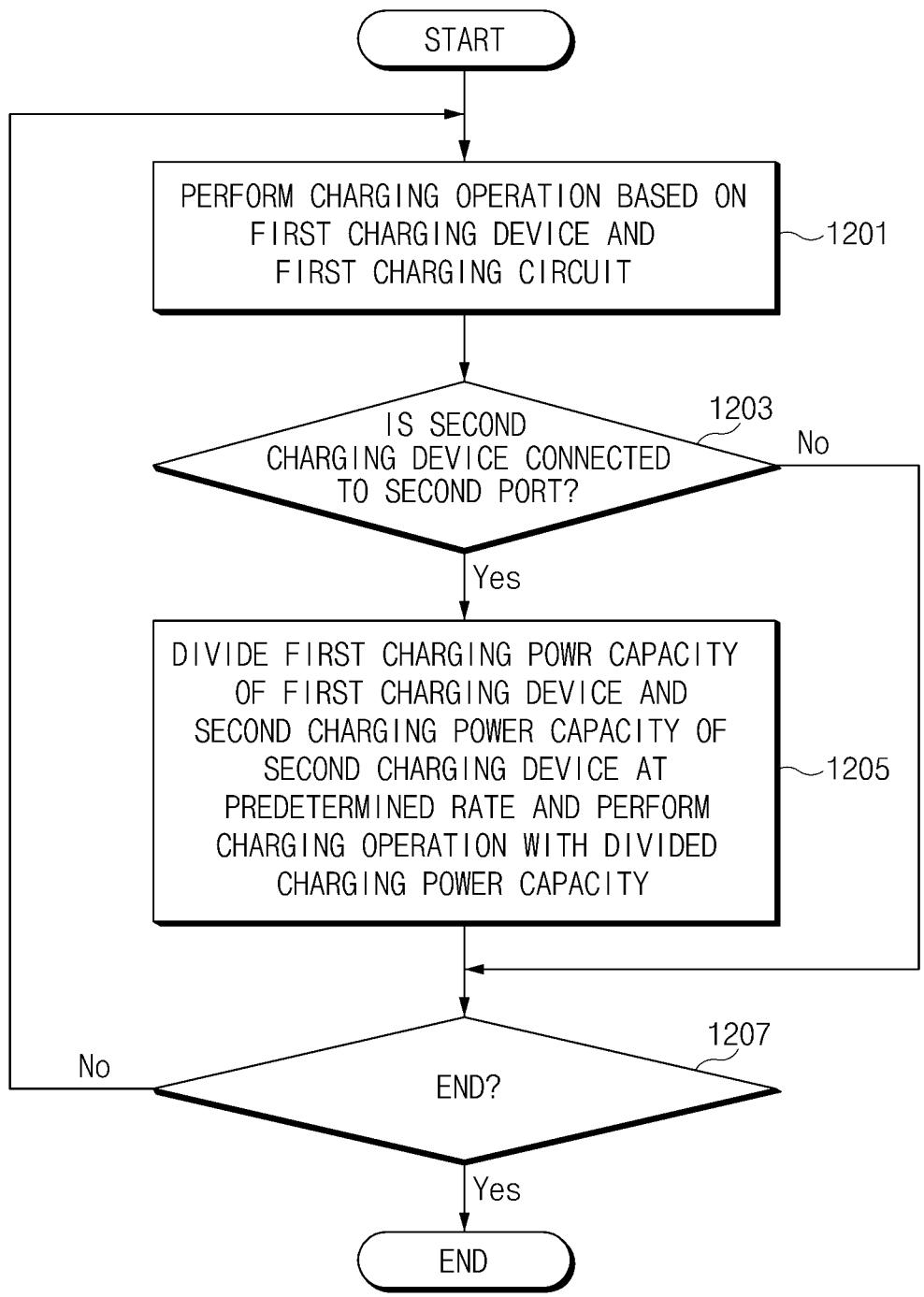
FIG. 12 is a flowchart illustrating an example of a charging control method based on a plurality of charging circuits according to an embodiment of the present disclosure.

FIG. 12 is a flowchart illustrating an example of a charging control method based on a plurality of charging circuits according to an embodiment of the present disclosure.

Referring to FIG. 12, in connection with the charging control method according to an embodiment of the present disclosure, in operation 1201, a control circuit 133 may charge a battery 140 based on a first charging device 201a and a first charging circuit 311, 411, or 811. For example, if the first charging device 201a is connected to a first port 101_a, the control circuit 133 may request the first charging device 201a to supply a charging power suitable for a battery charging power and a battery charging voltage of the first charging circuit 311. If a charging power of the first charging device 201a is less than the battery charging power, the control circuit 133 may request the first charging device 201a to supply a maximum charging power providable from the first charging device 201a.

In operation 1203, the control circuit 133 may determine whether a second charging device 20b is connected to a second port 101_b. If the second charging device 20b is not connected, the control circuit 133 may skip operations below. If the second charging device 20b is connected to the second port 101_b, in operation 1205, the control circuit 133 may divide first charging power capacity of the first charging device 201a and second charging power capacity of the second charging device 20b at a predetermined rate and may charge the battery 140 with the divided charging power capacity. For example, the control circuit 133 may control the first charging device 201a and the second charging device 20b such that the first charging power capacity and the second charging power capacity have the same rate. Alternatively, the control circuit 133 may request the second charging device 20b to supply a charging power corresponding to a maximum charging power providable from the first charging device 201a and a difference value (e.g., a value in which the maximum charging power of the first charging device 201a is subtracted from a maximum battery charging power of the battery 140).

In operation 1207, the control circuit 133 may determine whether an event associated with ending the charging operation occurs. If the event associated with ending the charging operation does not occur (e.g., if the battery 140 is fully charged or if the first and second charging devices 201a and 20b are disconnected), the control circuit 133 may move to operation 1201 to perform the operation again from operation 1201. Alternatively, the control circuit 133 may branch to operation 1205 to perform the operation again from operation 1205 depending on a previous operation state.

Figure 13:
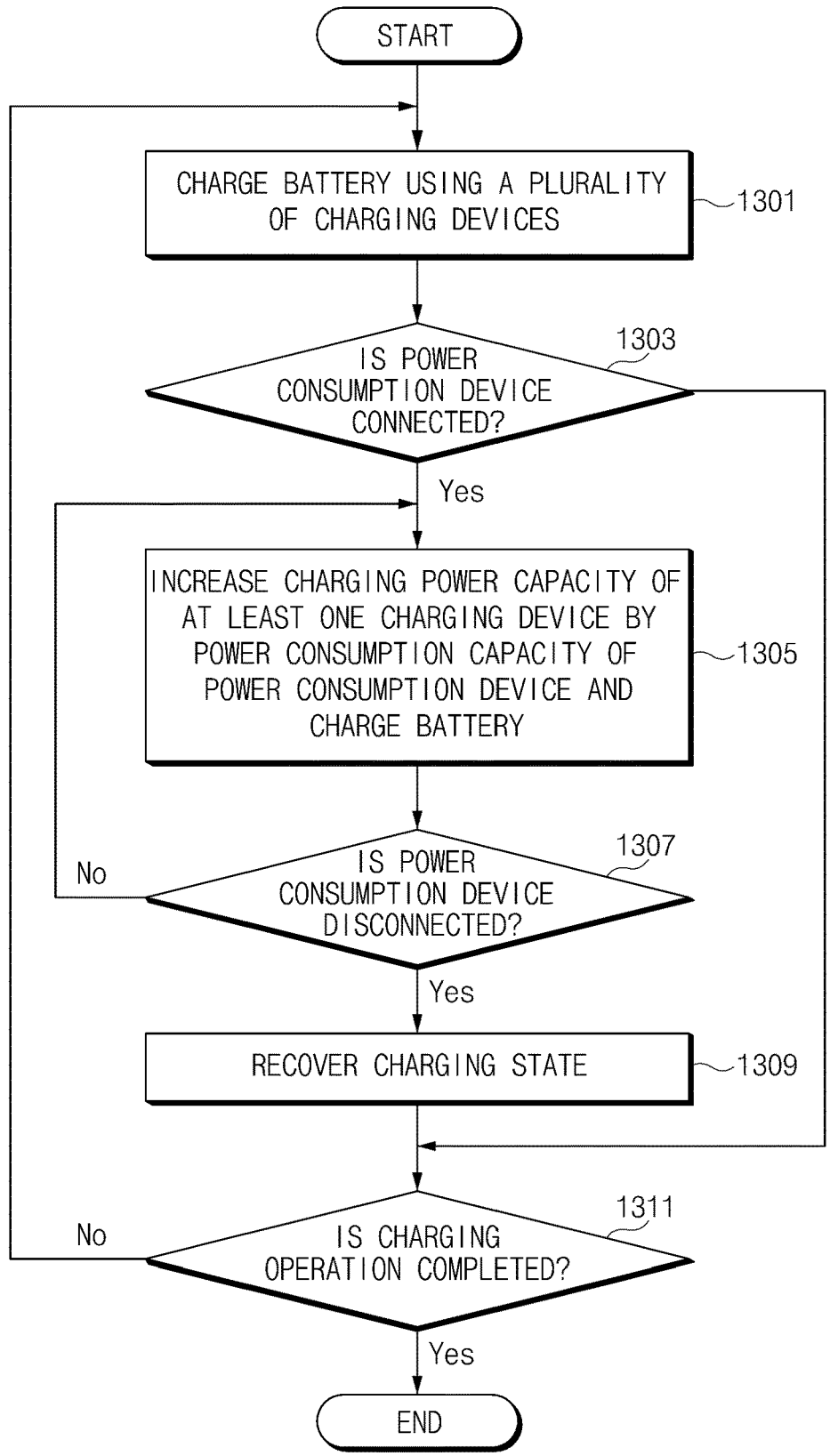
FIG. 13 is a flowchart illustrating an example of a charging and discharging control method according to an embodiment of the present disclosure.

FIG. 13 is a flowchart illustrating an example of a charging and discharging control method according to an embodiment of the present disclosure.

Referring to FIG. 13, in operation 1301, a control circuit 133 may charge a battery 140 using a plurality of charging devices. Alternatively, the control circuit 133 may charge the battery 140 using at least one charging device. In operation 1303, the control circuit 133 may determine whether a power consuming device 203 is connected. If the power consuming device 203 is not connected, the control circuit 133 may skip operations below and may branch to operation 1311. In the operation of charging the battery 140 using the plurality of charging devices, the control circuit 133 may request the plurality of charging devices to equally or non-equally divide charging power capacity corresponding to a battery charging power of a charging circuit.

If the power consuming device 203 is connected, in operation 1305, the control circuit 133 may increase charging power capacity of at least one charging device by power consuming capacity of the power consuming device 203 and may charge a battery 140 with the increased charging power capacity. According to an embodiment, the control circuit 133 may request the plurality of charging devices to equally or non-equally divide supply power capacity necessary for the power consuming device 203. Thus, if one or more of the plurality of charging devices may further supply a charging power by supply power capacity of the power consuming device 203. Alternatively, two charging devices may further supply a charging power by power in which supply power capacity of the power consuming device 203 is divided at a predetermined rate.

In operation 1307, the control circuit 133 may determine whether the power consuming device 203 is disconnected. If the power consuming device 203 is not disconnected, the control circuit 133 may branch to operation 1305 to perform the operation again from operation 1305. If the power consuming device 203 is disconnected, in operation 1309, the control circuit 133 may recover or reset a charging state. For example, the control circuit 133 may restore a charging power state of each of the plurality of charging devices to a state of operation 1301.

In operation 1311, the control circuit 133 may determine whether an event associated with ending the charging occurs. If the event associated with the charging occurs, the control circuit 133 may branch to operation 1301 to perform the operation again from operation 1301. When the event associated with ending the charging occurs, the control circuit 133 may perform processing according to ending the charging. For example, the control circuit 133 may output guide information, indicating the completion of the charging, on a display or an audio device. Alternatively, if the plurality of charging devices are disconnected from ports, the control circuit 133 may output guide information associated with disconnecting the charging devices or guide information about a charging state.

According to various embodiments, while a charging operation is performed using only one charging device although a plurality of charging devices are connected, when the charging device during the charging operation is disconnected, a control circuit may request the connected other charging devices to supply a battery charging power and may perform a charging operation with the battery charging power.

In addition, while simultaneously performing a charging operation using the plurality of charging devices which do not meet the battery charging power capacity (e.g., which supply a charging power which is lower than the battery charging power capacity), if a connection of at least one charging device is released, the control circuit may request each of the plurality of charging devices such that the sum of charging powers of the charging devices which maintain the connection is most close to the battery charging power capacity.

According to various embodiments, a charging control method may include detecting a connection of a second charging device to another port while charging a battery based on a first charging device connected to one of a plurality of ports, collecting information associated with a charging power of the second charging device, and determining charging power capacity of the first charging device, charging power capacity of the second charging device, and battery charging power capacity of a charging circuit.

According to various embodiments, the determining may include verifying charging power capacity of each of a plurality of charging devices through a communication circuit and determining the battery charging power capacity of the charging circuit.

According to various embodiments, the determining may include determining charging power capacity of each of the plurality of charging devices based on the battery charging power capacity of the charging circuit.

According to various embodiments, the determining may include determining charging power capacity of each of the plurality of charging devices as being greater than or equal to the battery charging power capacity of the charging circuit.

According to various embodiments, the method may further include adjusting the charging power capacity of each of the first charging device and the second charging device such that the sum of the charging power capacity of the first charging device and the charging power capacity of the second charging device is the same as the battery charging power capacity of the charging circuit connected to the battery or is higher than the battery charging power capacity of the charging circuit by a specified level.

According to various embodiments, if the charging power capacity of the first charging device is less than than the battery charging power capacity of the charging circuit, the adjusting may include requesting the second charging device to supply a difference value between the charging power capacity of the first charging device and the battery charging power capacity.

According to various embodiments, if the charging power capacity of the first charging device is less than the battery charging power capacity of the charging circuit and if the charging power capacity of the second charging device is greater than or equal to the battery charging power capacity, the adjusting may include stopping supplying the charging power of the first charging device and requesting the second charging device to supply a charging power corresponding to the battery charging power capacity.

According to various embodiments, if the charging power capacity of the first charging device and the charging power capacity of the second charging device are less than the battery charging power capacity, the adjusting may include requesting the first charging device and the second charging device to supply charging power capacity in which the sum of part of the charging power capacity of the first charging device and part of the charging power capacity of the second charging device is the same as the battery charging power capacity or is higher than the battery charging power capacity by a specified level.

According to various embodiments, the adjusting may include requesting the first charging device and the second charging device to supply a charging voltage of each of the first charging device and the second charging device such that the charging voltage of the first charging device and the charging voltage of the second charging device are the same as each other or are increased by a specified level.

According to various embodiments, the method may further include at least one of charging the battery using power from the plurality of charging devices connected to the ports or supplying power to at least one accessory device connected to the ports.

According to various embodiments, while a charging power from at least one of the first charging device and the second charging device is supplied to the battery, if a power consuming device is connected to another port, the adjusting may include requesting the first charging device and the second charging device to supply a charging power which is higher than the battery charging power capacity.

According to various embodiments, if the connection of the power consuming device is released, the method may further include requesting the first charging device and the second charging device to supply a charging power corresponding to the battery charging power capacity.

According to various embodiments, the adjusting may include requesting the first charging device and the second charging device to supply a charging power corresponding to the same charging voltage as the battery charging power capacity of the charging circuit between charging power capacity providable from the first charging device and charging power capacity providable from the second charging device.

According to various embodiments, if each of the charging power capacity of the first charging device and the charging power capacity of the second charging device is greater than or equal to the battery charging power capacity, the adjusting may include charging the battery with a charging power of the first charging device during a specified first time and charging the battery with a charging power of the second charging device during a specified second time.

According to various embodiments, if the charging power capacity of the first charging device is greater than the battery charging power capacity and if the charging power capacity of the second charging device is less than the battery charging power capacity, the adjusting may include alternately performing supplying a charging power of the first charging device to the battery during a predetermined time and supplying a difference value between the battery charging power capacity and a charging power of the second charging device at the first charging device while supplying a charging power of the second charging device during a predetermined time.

Figure 14:
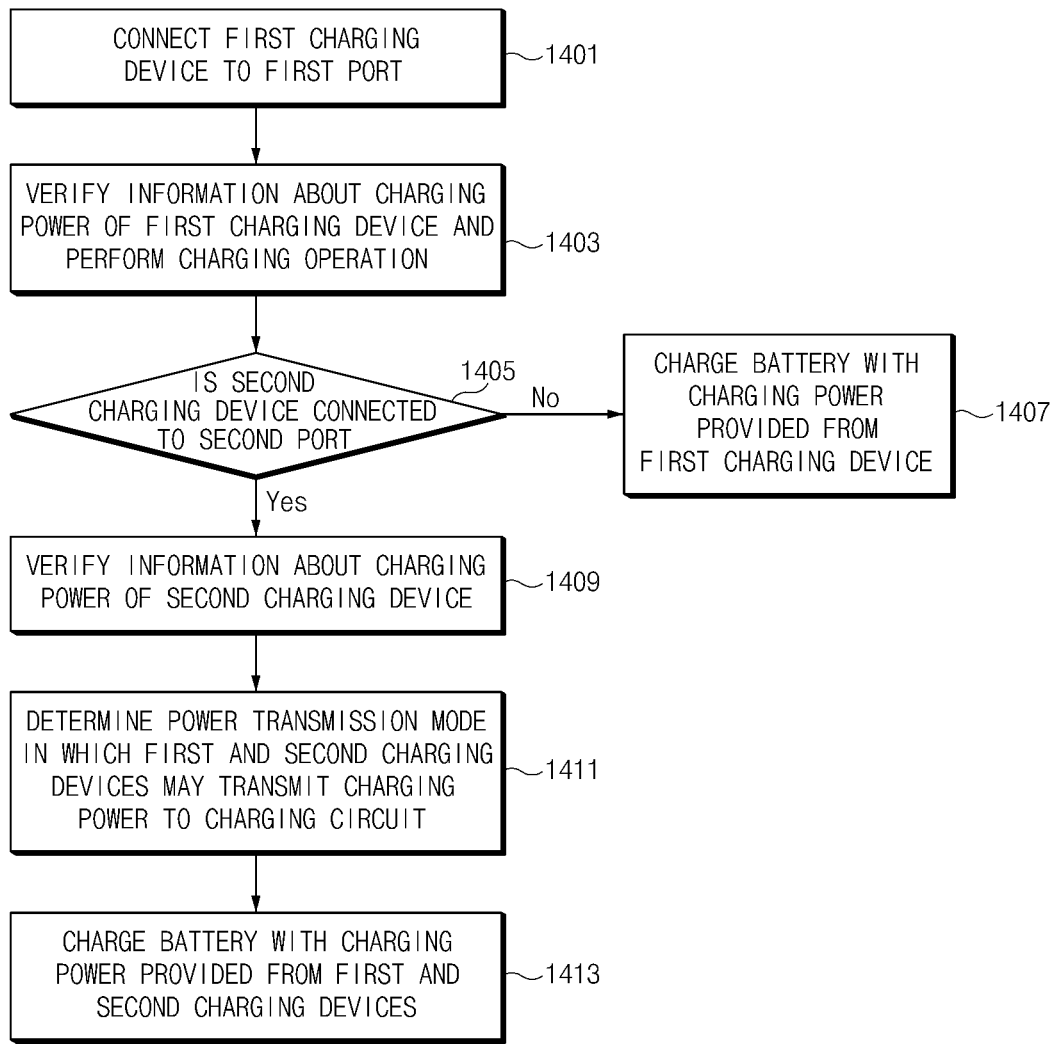
FIG. 14 is a flowchart illustrating another example of a charging control method according to an embodiment of the present disclosure

FIG. 14 is a flowchart illustrating another example of a charging control method according to an embodiment of the present disclosure.

Referring to FIG. 14, in operation 1401, a first charging device 201a may be connected to a first port 101_a of an electronic device 100. If the first charging device 201a is connected to the first port 101_a, a control circuit 133 may recognize the connection of the first charging device 201a.

In operation 1403, the control circuit 133 may verify information about a charging power of the first charging device 201a and may perform a charging operation based on the verified information. For example, the control circuit 133 may communicate with the first charging device 201a to supply a charging power close to battery charging power capacity necessary for a charging circuit 213 in a maximum charging power providable from the first charging device 201a. Alternatively, according to any one of the above-mentioned various manners, the control circuit 133 may request the first charging device 201a to supply a charging power at at least one charging power level among levels of charging powers providable from the first charging device 201a.

In operation 1405, the control circuit 133 may determine whether a second charging device 20b is connected to a second port 101_b of the electronic device 100. If the second charging device 20b is not connected to the second port 101_b, in operation 1407, the control circuit 133 may charge the battery 140 with a charging power supplied from the first charging device 201a.

If the second charging device 20b is connected to the second port 101_b in operation 1405, in operation 1409, the control circuit 133 may verify information about a charging power of the second charging device 201b. In this regard, the control circuit 133 may communicate with the second charging device 20b using a communication circuit.

In operation 1411, the control circuit 133 may determine a power transmission mode where each of the first and second charging devices 201a and 20b transmits a charging power to the charging circuit 213. For example, the control circuit 133 may calculate battery charging power capacity of the charging circuit 213 to be adjusted to charging power capacity providable from each of the first and second charging devices 201a and 20b and may request each of the first and second charging devices 201a and 20b to supply the calculated charging power capacity. In operation 1413, a charging power supplied from each of the first and second charging devices 201a and 20b may be transmitted to the charging circuit 123, and the charging circuit 123 may charge the battery 140 with the transmitted charging power.

Figure 15:
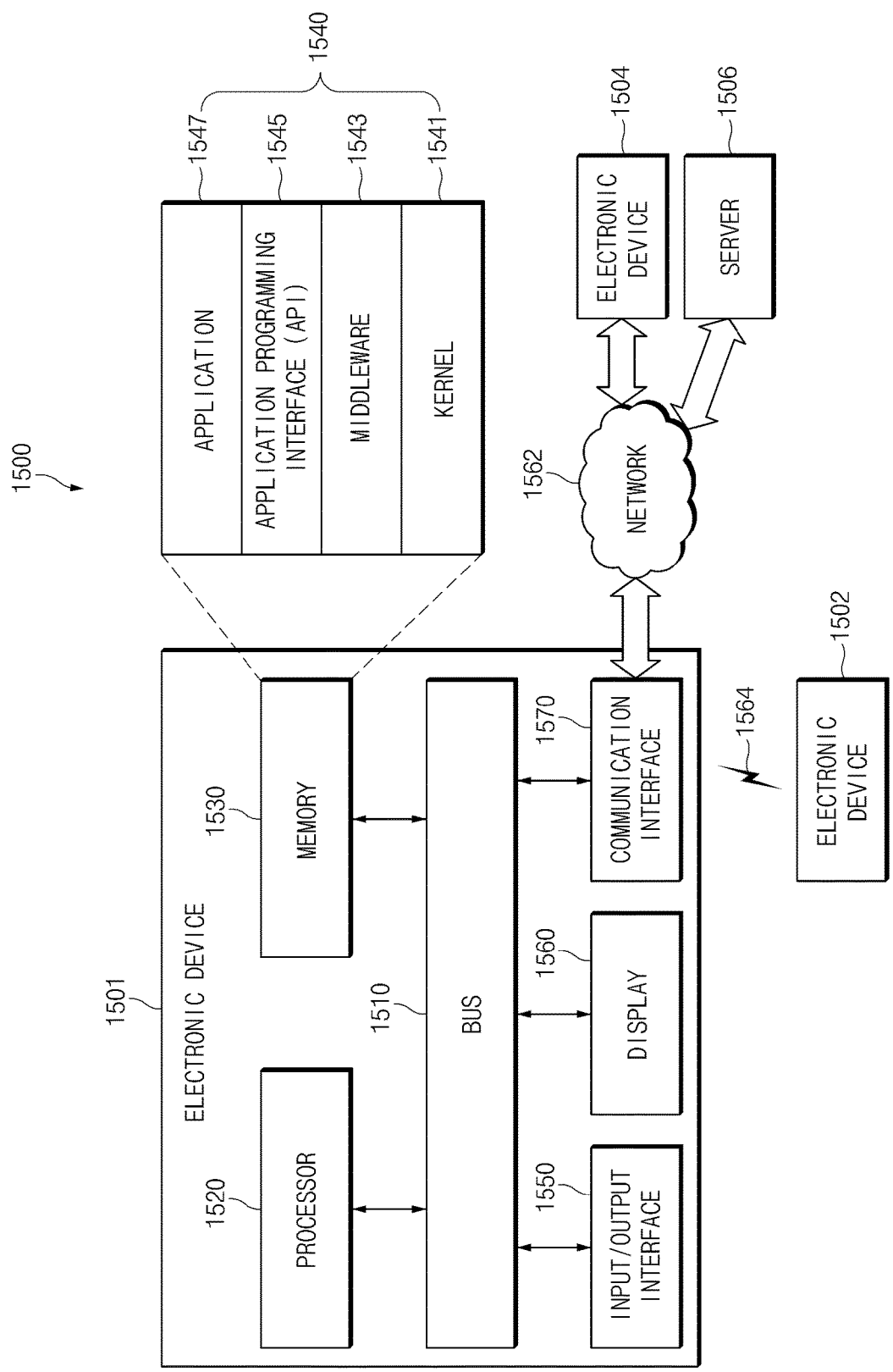
FIG. 15 is a block diagram illustrating a configuration of an electronic device in a network environment according to an embodiment of the present disclosure.

FIG. 15 is a block diagram illustrating a configuration of an electronic device in a network environment according to an embodiment.

Referring to FIG. 15, in various embodiments, an electronic device 1501 and a first external electronic device 1502, a second external electronic device 1504, or a server 1506 may connect with each other through a network 1562 or local-area communication 1564. The electronic device 1501 may include a bus 1510, a processor 1520, a memory 1530, an input and output interface 1550, a display 1560, and a communication interface 1570. In various embodiments, at least one of the components may be omitted from the electronic device 1501, or other components may be additionally included in the electronic device 1501.

The bus 1510 may be, for example, a circuit which connects the components 1520 to 1570 with each other and transmits a communication signal (e.g., a control message and/or data) between the components.

The processor 1520 may include one or more of a central processing unit (CPU), an application processor (AP), or a communication processor (CP). For example, the processor 1520 may perform calculation or data processing about control and/or communication of at least another of the components of the electronic device 1501.

The memory 1530 may include a volatile and/or non-volatile memory. The memory 1530 may store, for example, a command or data associated with at least another of the components of the electronic device 1501. According to an embodiment, the memory 1530 may store software and/or a program 1540. The program 1540 may include, for example, a kernel 1541, a middleware 1543, an application programming interface (API) 1545, and/or an least one application program 1547 (or "at least one application"), and the like. At least part of the kernel 1541, the middleware 1543, or the API 1545 may be referred to as an operating system (OS).

The kernel 1541 may control or manage, for example, system resources (e.g., the bus 1510, the processor 1520, or the memory 1530, and the like) used to execute an operation or function implemented in the other programs (e.g., the middleware 1543, the API 1545, or the application program 1547). Also, as the middleware 1543, the API 1545, or the application program 1547 accesses a separate component of the electronic device 1501, the kernel 1541 may provide an interface which may control or manage system resources.

The middleware 1543 may play a role as, for example, a go-between such that the API 1545 or the application program 1547 communicates with the kernel 1541 to communicate data.

Also, the middleware 1543 may process one or more work requests, received from the application program 1547, in order of priority. For example, the middleware 1543 may assign priority which may use system resources (the bus 1510, the processor 1520, or the memory 1530, and the like) of the electronic device 1501 to at least one of the at least one application program 1547. For example, the middleware 1543 may perform scheduling or load balancing for the one or more work requests by processing the one or more work requests in order of the priority assigned to the at least one of the at least one application program 1547.

The API 1545 may be, for example, an interface in which the application program 1547 controls a function provided from the kernel 1541 or the middleware 1543. For example, the API 1545 may include at least one interface or function (e.g., a command) for file control, window control, image processing, or text control, and the like.

The input and output interface 1550 may play a role as, for example, an interface which may transmit a command or data input from a user or another external device to another component (or other components) of the electronic device 1501. Also, input and output interface 1550 may output an instruction or data received from another component (or other components) of the electronic device 1501 to the user or the other external device. The input and output interface 1550 can correspond to ports 101_a . . . 101_n.

The display 1560 may include, for example, a liquid crystal display (LCD), a light emitting diode (LED) display, an organic LED (OLED) display, a microelectromechanical systems (MEMS) display, or an electronic paper display. The display 1560 may display, for example, a variety of content (e.g., text, images, videos, icons, or symbols, and the like) to the user. The display 1560 may include a touch screen, and may receive, for example, touch, gesture, proximity, or a hovering input using an electronic pen or part of a body of the user.

The communication interface 1570 may establish communication between, for example, the electronic device 1501 and an external device (e.g., a first external electronic device 1502, a second external electronic device 1504, or a server 1506). For example, the communication interface 1570 may connect to a network 1562 through wireless communication or wired communication and may communicate with the external device (e.g., the second external electronic device 1504 or the server 1506).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1564. The local-area communication 1564 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 1501 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 1562 may include a telecommunications network, for example, at least one of a computer network (e.g., a local area network (LAN) or a wide area network (WAN)), the Internet, or a telephone network.

Each of the first and second external electronic devices 1502 and 1504 may be the same as or different device from the electronic device 1501. According to an embodiment, the server 1506 may include a group of one or more servers. According to various embodiments, all or some of operations executed in the electronic device 1501 may be executed in another electronic device or a plurality of electronic devices (e.g., the first external electronic device 1502, the second external electronic device 1504, or the server 1506). According to an embodiment, if the electronic device 1501 should perform any function or service automatically or according to a request, it may request another device (e.g., the first external electronic device 1502, the second external electronic device 1504, or the server 106) to perform at least part of the function or service, rather than executing the function or service for itself or in addition to the function or service. The other electronic device (e.g., the first external electronic device 1502, the second external electronic device 1504, or the server 1506) may execute the requested function or the added function and may transmit the executed result to the electronic device 1501. The electronic device 1501 may process the received result without change or additionally and may provide the requested function or service. For this purpose, for example, cloud computing technologies, distributed computing technologies, or client-server computing technologies may be used.

Figure 16:
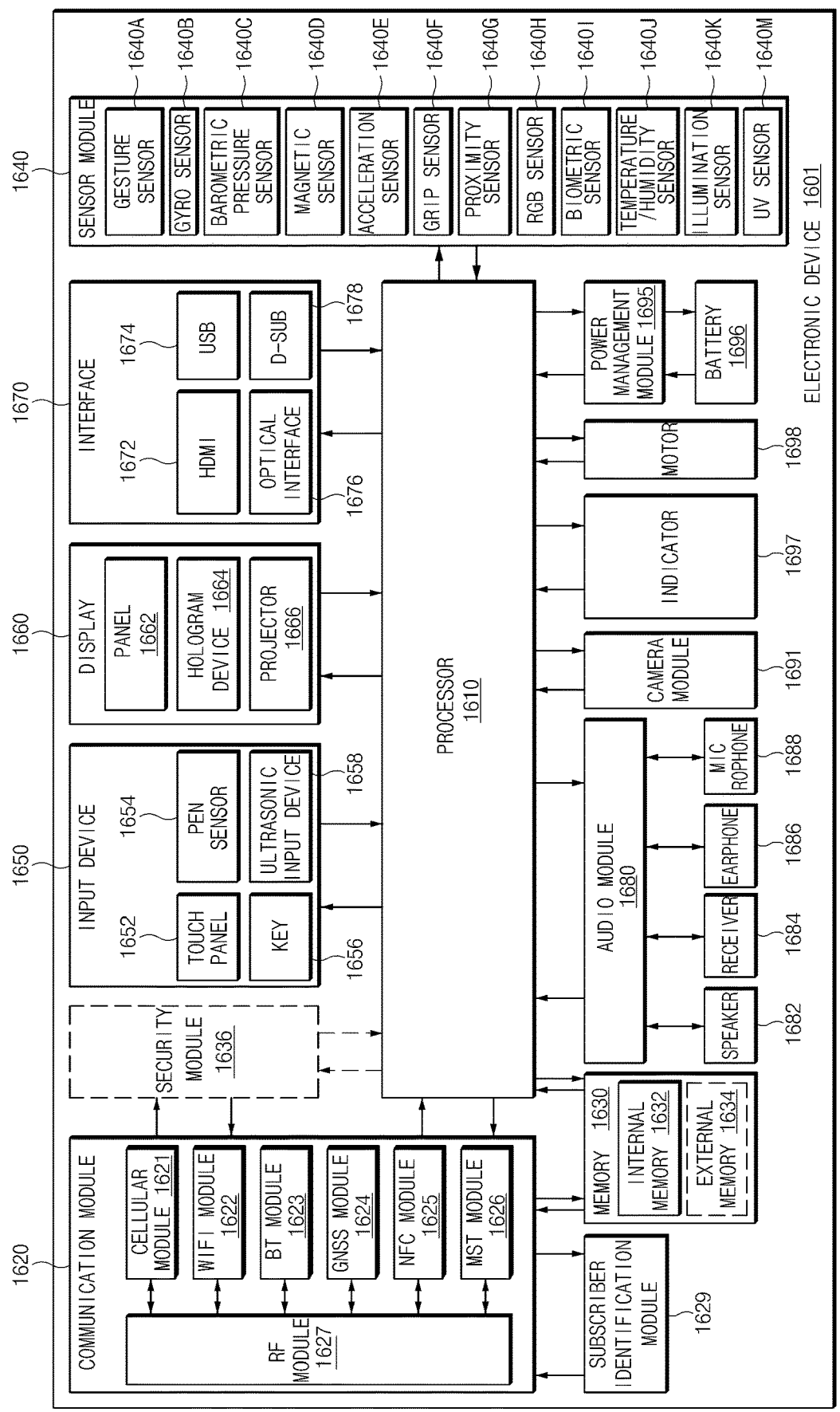
FIG. 16 is a block diagram illustrating a configuration of an electronic device according to an embodiment of the present disclosure.

FIG. 16 is a block diagram illustrating a configuration of an electronic device according to various embodiments.

Referring to FIG. 16, the electronic device 1601 may include, for example, all or part of an electronic device 1501 shown in FIG. 15. The electronic device 1601 may include one or more processors 1610 (e.g., application processors (APs)), a communication module 1620, a subscriber identification module (SIM) 1629, a memory 1630, a security module 1636, a sensor module 1640, an input device 1650, a display 1660, an interface 1670, an audio module 1680, a camera module 1691, a power management module 1695, a battery 1696, an indicator 1697, and a motor 1698.

The processor 1610 may drive, for example, an operating system (OS) or an application program to control a plurality of hardware or software components connected thereto and may process and compute a variety of data. The processor 1610 may be implemented with, for example, a system on chip (SoC). According to an embodiment, the processor 1610 may include a graphic processing unit (GPU) (not shown) and/or an image signal processor (not shown). The processor 1610 may include at least some (e.g., a cellular module 1621) of the components shown in FIG. 16. The processor 1610 may load a command or data received from at least one of other components (e.g., a non-volatile memory) into a volatile memory to process the data and may store various data in a non-volatile memory.

The communication module 1620 may have the same or similar configuration to a communication interface 1570 of FIG. 15. The communication module 1620 may include, for example, the cellular module 1621, a wireless-fidelity (Wi-Fi) module 1622, a Bluetooth (BT) module 1623, a global navigation satellite system (GNSS) module 1624 (e.g., a GPS module, a Glonass module, a Beidou module, or a Galileo module), a near field communication (NFC) module 1625, an MST module 1626, and a radio frequency (RF) module 1627.

The cellular module 1621 may provide, for example, a voice call service, a video call service, a text message service, or an Internet service, and the like through a communication network. According to an embodiment, the cellular module 1621 may identify and authenticate the electronic device 1601 in a communication network using the SIM 1629 (e.g., a SIM card). According to an embodiment, the cellular module 1621 may perform at least part of functions which may be provided by the processor 1610. According to an embodiment, the cellular module 1621 may include a communication processor (CP).

The Wi-Fi module 1622, the BT module 1623, the GNSS module 1624, the NFC module 1625, or the MST module 1626 may include, for example, a processor for processing data transmitted and received through the corresponding module. According to various embodiments, at least some (e.g., two or more) of the cellular module 1621, the Wi-Fi module 1622, the BT module 1623, the GNSS module 1624, the NFC module 1625, or the MST module 1626 may be included in one integrated chip (IC) or one IC package.

The RF module 1627 may transmit and receive, for example, a communication signal (e.g., an RF signal). Though not shown, the RF module 1627 may include, for example, a transceiver, a power amplifier module (PAM), a frequency filter, or a low noise amplifier (LNA), or an antenna, and the like. According to another embodiment, at least one of the cellular module 1621, the Wi-Fi module 1622, the BT module 1623, the GNSS module 1624, the NFC module 1625, or the MST module 1626 may transmit and receive an RF signal through a separate RF module.

The SIM 1629 may include, for example, a card which includes a SIM and/or an embedded SIM. The SIM 1629 may include unique identification information (e.g., an integrated circuit card identifier (ICCID)) or subscriber information (e.g., an international mobile subscriber identity (IMSI)).

The memory 1630 (e.g., a memory 1530 of FIG. 15) may include, for example, an embedded memory 1632 or an external memory 1634. The embedded memory 1632 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1634 may include a flash drive, for example, a compact flash (CF), a secure digital (SD), a micro-SD, a mini-SD, an extreme digital (xD), a multimedia car (MMC), or a memory stick, and the like. The external memory 1634 may operatively and/or physically connect with the electronic device 1601 through various interfaces.

The secure module 1636 may be a module which has a relatively higher secure level than the memory 1630 and may be a circuit which stores secure data and guarantees a protected execution environment. The secure module 1636 may be implemented with a separate circuit and may include a separate processor. The secure module 1636 may include, for example, an embedded secure element (eSE) which is present in a removable smart chip or a removable SD card or is embedded in a fixed chip of the electronic device 1601. Also, the secure module 1636 may be driven by an OS different from the OS of the electronic device 1601. For example, the secure module 1636 may operate based on a Java card open platform (JCOP) OS.

The sensor module 1640 may measure, for example, a physical quantity or may detect an operation state of the electronic device 1601, and may convert the measured or detected information to an electric signal. The sensor module 1640 may include at least one of, for example, a gesture sensor 1640A, a gyro sensor 1640B, a barometer sensor 1640C, a magnetic sensor 1640D, an acceleration sensor 1640E, a grip sensor 1640F, a proximity sensor 1640G, a color sensor 1640H (e.g., red, green, blue (RGB) sensor), a biometric sensor 1640I, a temperature/humidity sensor 1640J, an illumination sensor 1640K, or an ultraviolet (UV) sensor 1640M. Additionally or alternatively, the sensor module 1640 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1640 may further include a control circuit for controlling at least one or more sensors included therein. According to various embodiments, the electronic device 1601 may further include a processor configured to control the sensor module 1640, as part of the processor 1610 or to be independent of the processor 1610. While the processor 1610 is in a sleep state, the electronic device 1601 may control the sensor module 1640.

The input device 1650 may include, for example, a touch panel 1652, a (digital) pen sensor 1654, a key 1656, or an ultrasonic input device 1658. The touch panel 1652 may use at least one of, for example, a capacitive type, a resistive type, an infrared type, or an ultrasonic type. Also, the touch panel 1652 may further include a control circuit. The touch panel 1652 may further include a tactile layer and may provide a tactile reaction to a user.

The (digital) pen sensor 1654 may be, for example, part of the touch panel 1652 or may include a separate sheet for recognition. The key 1656 may include, for example, a physical button, an optical key, or a keypad. The ultrasonic input device 1658 may allow the electronic device 1601 to detect a sound wave using a microphone (e.g., a microphone 1688) and to verify data through an input tool generating an ultrasonic signal.

The display 1660 (e.g., a display 1560 of FIG. 15) may include a panel 1662, a hologram device 1664, or a projector 1666. The panel 1662 may include the same or similar configuration to the display 160 or 1560. The panel 1662 may be implemented to be, for example, flexible, transparent, or wearable. The panel 1662 and the touch panel 1652 may be integrated into one module. The hologram device 1664 may show a stereoscopic image in a space using interference of light. The projector 1666 may project light onto a screen to display an image. The screen may be positioned, for example, inside or outside the electronic device 1601. According to an embodiment, the display 1660 may further include a control circuit for controlling the panel 1662, the hologram device 1664, or the projector 1666.

The interface 1670 may include, for example, a high-definition multimedia interface (HDMI) 1672, a universal serial bus (USB) 1674, an optical interface 1676, or a D-subminiature 1678. The interface 1670 may be included in, for example, a communication interface 170 or 1570 shown in FIG. 2 or 15. Additionally or alternatively, the interface 1670 may include, for example, a mobile high definition link (MHL) interface, an SD card/multimedia card (MMC) interface, or an infrared data association (IrDA) standard interface. In certain embodiments, the interface 1670 can include ports 101_*a* . . . 101_*n*.

The audio module 1680 may convert a sound and an electric signal in dual directions. At least part of components of the audio module 1680 may be included in, for example, an input and output interface 1550 (or a user interface) shown in FIG. 15. The audio module 1680 may process sound information input or output through, for example, a speaker 1682, a receiver 1684, an earphone 1686, or the microphone 1688, and the like.

The camera module 1691 may be a device which captures a still image and a moving image. According to an embodiment, the camera module 1691 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1695 may manage, for example, power of the electronic device 1601. According to an embodiment, though not shown, the power management module 1695 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The power management module 1695 can incorporate the circuits depicted in FIGS. 2-8, and can operate according to the flow charts of FIGS. 9-14.

The battery gauge may measure, for example, the remaining capacity of the battery 1696 and voltage, current, or temperature thereof while the battery 1696 is charged. The battery 1696 may include, for example, a rechargeable battery or a solar battery. The battery can correspond to battery 140.

The indicator 1697 may display a specific state of the electronic device 1601 or part (e.g., the processor 1610) thereof, for example, a booting state, a message state, or a charging state, and the like. The motor 1698 may convert an electric signal into mechanical vibration and may generate vibration or a haptic effect, and the like. Though not shown, the electronic device 1601 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 17:
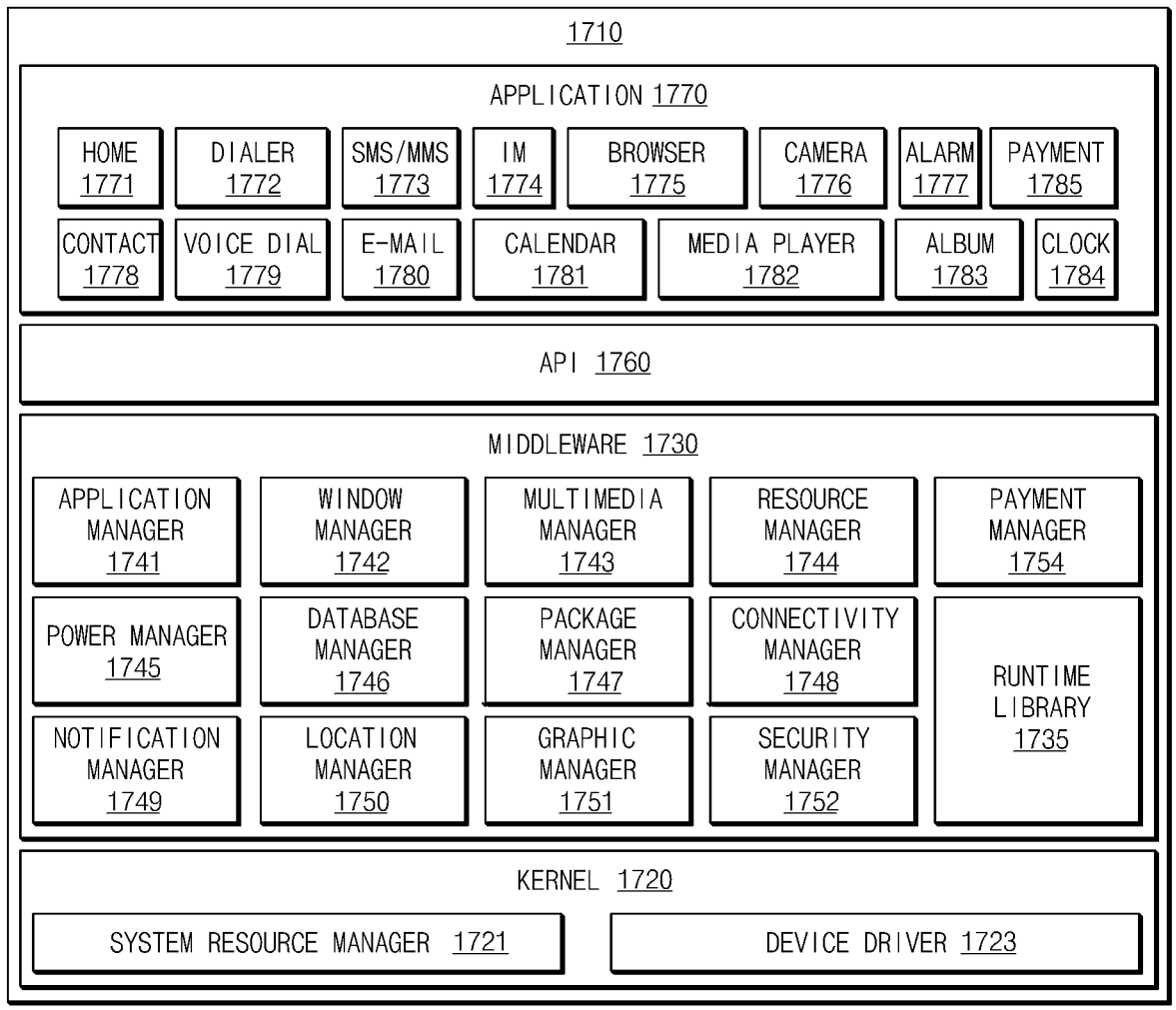
FIG. 17 is a block diagram illustrating a configuration of a program module according to an embodiment of the present disclosure.

FIG. 17 is a block diagram illustrating a configuration of a program module according to various embodiments.

According to an embodiment, the program module 1710 (e.g., a program 1540 of FIG. 15) may include an operating system (OS) for controlling resources associated with an electronic device (e.g., an electronic device 1501 of FIG. 15) and/or various applications (e.g., an application program 1547 of FIG. 15) which are executed on the OS. The OS may be, for example, Android, iOS, Windows, Symbian, Tizen, or Bada, and the like.

The program module 1710 may include a kernel 1720, a middleware 1730, an application programming interface (API) 1760, and/or an application 1770. At least part of the program module 1710 may be preloaded on the electronic device, or may be downloaded from an external electronic device (e.g., a first external electronic device 1502, a second external electronic device 1504, or a server 1506, and the like of FIG. 15).

The kernel 1720 (e.g., a kernel 1541 of FIG. 15) may include, for example, a system resource manager 1721 and/or a device driver 1723. The system resource manager 1721 may control, assign, or collect, and the like system resources. According to an embodiment, the system resource manager 1721 may include a process management unit, a memory management unit, or a file system management unit, and the like. The device driver 1723 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1730 (e.g., a middleware 1543 of FIG. 15) may provide, for example, functions the application 1770 needs in common, and may provide various functions to the application 1770 through the API 1760 such that the application 1770 efficiently uses limited system resources in the electronic device. According to an embodiment, the middleware 1730 (e.g., the middleware 1543) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, a security manager 1752, or a payment manager 1754.

The runtime library 1735 may include, for example, a library module used by a compiler to add a new function through a programming language while the application 1770 is executed. The runtime library 1735 may perform a function about input and output management, memory management, or an arithmetic function.

The application manager 1741 may manage, for example, a life cycle of at least one of the application 1770. The window manager 1742 may manage graphic user interface (GUI) resources used on a screen of the electronic device. The multimedia manager 1743 may determine a format utilized for reproducing various media files and may encode or decode a media file using a codec corresponding to the corresponding format. The resource manager 1744 may manage source codes of at least one of the application 1770, and may manage resources of a memory or a storage space, and the like.

The power manager 1745 may act together with, for example, a basic input/output system (BIOS) and the like, may manage a battery or a power source, and may provide power information utilized for an operation of the electronic device. The database manager 1746 may generate, search, or change a database to be used in at least one of the application 1770. The package manager 1747 may manage installation or update of an application distributed by a type of a package file.

The connectivity manager 1748 may manage, for example, wireless connection such as Wi-Fi connection or BT connection, and the like. The notification manager 1749 may display or notify events, such as an arrival message, an appointment, and proximity notification, by a method which is not disturbed to the user. The location manager 1750 may manage location information of the electronic device. The graphic manager 1751 may manage a graphic effect to be provided to the user or a user interface (UI) related to the graphic effect. The security manager 1752 may provide all security functions utilized for system security or user authentication, and the like. According to an embodiment, when the electronic device (e.g., an electronic device 100 or 1501 of FIG. 1 or 15) has a phone function, the middleware 1730 may further include a telephony manager (not shown) for managing a voice or video communication function of the electronic device.

The middleware 1730 may include a middleware module which configures combinations of various functions of the above-described components. The middleware 1730 may provide a module which specializes according to kinds of OSs to provide a differentiated function. Also, the middleware 1730 may dynamically delete some of old components or may add new components.

The API 1760 (e.g., an API 1545 of FIG. 15) may be, for example, a set of API programming functions, and may be provided with different components according to OSs. For example, in case of Android or iOS, one API set may be provided according to platforms. In case of Tizen, two or more API sets may be provided according to platforms.

The application 1770 (e.g., an application program 1547 of FIG. 15) may include one or more of, for example, a home application 1771, a dialer application 1772, a short message service/multimedia message service (SMS/MMS) application 1773, an instant message (IM) application 1774, a browser application 1775, a camera application 1776, an alarm application 1777, a contact application 1778, a voice dial application 1779, an e-mail application 1780, a calendar application 1781, a media player application 1782, an album application 1783, a clock application 1784, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1770 may include an application (hereinafter, for better understanding and ease of description, referred to as "information exchange application") for exchanging information between the electronic device (e.g., the electronic device 1501 of FIG. 15) and an external electronic device (e.g., the first external electronic device 1502 or the second external electronic device 1504). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1502 or the second external electronic device 1504). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1502 or the second external electronic device 1504) which communicates with the electronic device, an application which operates in the external electronic device, or a service (e.g., a call service or a message service) provided from the external electronic device.

According to an embodiment, the application 1770 may include an application (e.g., the health card application of a mobile medical device) which is preset according to attributes of the external electronic device (e.g., the first external electronic device 1502 or the second external electronic device 1504). According to an embodiment, the application 1770 may include an application received from the external electronic device (e.g., the server 1506, the first external electronic device 1502, or the second external electronic device 1504). According to an embodiment, the application 1770 may include a preloaded application or a third party application which may be downloaded from a server. Names of the components of the program module 1710 according to various embodiments of the present disclosure may differ according to kinds of OSs.

According to various embodiments, at least part of the program module 1710 may be implemented with software, firmware, hardware, or at least two or more combinations thereof. At least part of the program module 1710 may be implemented (e.g., executed) by, for example, a processor (e.g., a processor 1520 of FIG. 15). At least part of the program module 1710 may include, for example, a module, a program, a routine, sets of instructions, or a process, and the like for performing one or more functions.

The terminology "module" used herein may mean, for example, a unit including one of hardware, or hardware programmed with instructions in memory, and combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a plurality of ports, wherein the plurality of ports comprise a first port and a second port;
   a battery configured to receive a charging power through at least one of the plurality of ports;
   a control circuit configured to control charging of the battery by using power from a plurality of charging devices connected to the plurality of ports, the plurality of charging devices including at least one variable capacity charging device;
   a charging circuit configured to charge the battery by using power supplied from the plurality of charging devices; and
   a plurality of communication circuits configured to communicate with the plurality of charging devices and receive a plurality of power and voltage information from the at least one variable capacity charging device,
   wherein the control circuit electrically connected with the plurality of communication circuits and the charging circuit is configured to:
     set a charging power level of the at least one variable capacity charging device based on the plurality of power and voltage information and a battery charging power capacity of the charging circuit;
     when a second charging device is connected to the second port while supplying a charging power from a first charging device connected to the first port to the battery, set a charging power level of the second charging device in response to charging power level of the first charging device; and
     when a charging power capacity of the first charging device is less than the battery charging power capacity of the charging circuit, request the second charging device to supply a difference value between the charging power capacity of the first charging device and the battery charging power capacity.

2. The electronic device of claim 1, wherein the control circuit is configured to:
   obtain information of charging power capacity of each of the plurality of charging devices through the plurality of communication circuits; and
   set the battery charging power capacity of the charging circuit.

3. The electronic device of claim 1, wherein the control circuit is configured to:
   set a charging power level of each of the plurality of charging devices based on the battery charging power capacity of the charging circuit.

4. The electronic device of claim 1, wherein the control circuit is configured to:
   set a charging power level of each of the plurality of charging devices to be greater than or equal to the battery charging power capacity of the charging circuit.

5. The electronic device of claim 1, wherein the control circuit is configured to:
when a charging power capacity of the first charging device is less than the battery charging power capacity of the charging circuit and when the charging power capacity of the second charging device is greater than or equal to the battery charging power capacity of the charging circuit, switch from charging the battery with the first charging device to charging the battery with the second charging device.

6. The electronic device of claim 1, wherein the control circuit is configured to:
when the charging power capacity of the first charging device and the charging power capacity of the second charging device are less than the battery charging power capacity of the charging circuit, adjust the charging power level of the first charging device and the charging power level of the second charging device such that a sum of the charging power level of the first charging device and the charging power level of the second charging device is equal to or higher by a specified level than the battery charging power capacity.

7. The electronic device of claim 1, wherein the control circuit is configured to:
request the first charging device and the second charging device to supply a charging voltage of each of the first charging device and the second charging device such that the charging voltage of the first charging device and the charging voltage of the second charging device are the same as each other or are increased to a specified level or more.

8. The electronic device of claim 1, wherein the control circuit is configured to:
charge the battery using the power from the plurality of charging devices connected to the plurality of ports; or
supply power to at least power consuming device connected to the plurality of ports.

9. The electronic device of claim 8,
wherein the plurality of ports comprise a first port and a second port,
wherein the control circuit is configured to:
when a power consuming device is connected to the second port while a first charging device connected to the first port to the battery provides a first charging power level, request the first charging device to supply charging power higher than the first charging power level.

10. The electronic device of claim 1, wherein the charging circuit comprises:
one charging circuit connected with the plurality of ports.

11. The electronic device of claim 1, wherein the charging circuit comprises:
a plurality of charging circuits respectively connected with the plurality of ports.

12. The electronic device of claim 1, wherein the at least one of the plurality of ports has USB type C.

13. A charging control method, the method comprising:
detecting, by at least one processor of an electronic device, a connection of a second charging device to another port while charging a battery of an electronic device based on a first charging device connected to one port among a plurality of ports, wherein the second charging device is a variable capacity charging device, wherein the plurality of ports comprise a first port and a second port;

obtaining, by the at least one processor, a plurality of power and voltage information from the second charging device; and
setting, by the at least one processor, charging power of the first charging device, charging power of the second charging device, and battery charging power capacity of a charging circuit of the electronic device based on the plurality of power and voltage information from the second charging device,
wherein the setting further comprises:
when a second charging device is connected to the second port while supplying a charging power from a first charging device connected to the first port to the battery, setting a charging power level of the second charging device in response to charging power level of the first charging device,
when a charging power capacity of the first charging device is less than the battery charging power capacity of the charging circuit, requesting the second charging device to supply a difference value between the charging power capacity of the first charging device and the battery charging power capacity.

14. The method of claim 13, wherein the setting comprises:
obtaining information of the charging power capacity of each of the first and second charging devices through a communication circuit of an electronic device; and
setting the battery charging power capacity of the charging circuit.

15. The method of claim 13, wherein the setting comprises:
setting the charging power of each of the first and second charging devices based on the battery charging power capacity of the charging circuit.

16. The method of claim 13, wherein the setting comprises:
setting the charging power of each of the first and second charging devices to be greater than or equal to the battery charging power capacity of the charging circuit.

17. The method of claim 13, further comprising:
adjusting the charging power of each of the first charging device and the second charging device such that a sum of the charging power of the first charging device and the charging power of the second charging device is the same as the battery charging power capacity of the charging circuit connected to the battery or is higher than the battery charging power capacity of the charging circuit by a specified level.

18. An electronic device, comprising:
a plurality of ports, wherein the plurality of ports comprise a first port and a second port;
a battery configured to receive a charging power through at least one of the plurality of ports;
a plurality of communication circuits configured to communicate with a plurality of external devices, wherein the plurality of external devices including at least one variable capacity charging device;
a control circuit configured to set power of each of the plurality of external devices connected to the plurality of ports;
a charging circuit configured to charge the battery by using the power,
wherein the control circuit is configured to:
receive a plurality of power and voltage information from the at least one variable capacity charging device through the plurality of communication circuits;

set a charging mode of the charging circuit and charging power capacity of each of the at least one variable capacity charging device based on the plurality of power and voltage information;

when a second charging device is connected to the second port while supplying a charging power from a first charging device connected to the first port to the battery, set a charging power level of the second charging device in response to charging power level of the first charging device; and when a charging power capacity of the first charging device is less than the battery charging power capacity of the charging circuit and when the charging power capacity of the second charging device is greater than or equal to the battery charging power capacity of the charging circuit, switch from charging the battery with the first charging device to charging the battery with the second charging device.

* * * * *